US012062183B2

United States Patent
Chaoui et al.

(10) Patent No.: US 12,062,183 B2
(45) Date of Patent: Aug. 13, 2024

(54) CLOSED SURFACE FITTING FOR SEGMENTATION OF ORTHOPEDIC MEDICAL IMAGE DATA

(71) Applicant: HOWMEDICA OSTEONICS CORP., Mahwah, NJ (US)

(72) Inventors: Jean Chaoui, Locmaria Plouzané (FR); Maximilien Mayya, Brest (FR); Manuel Jean-Marie Urvoy, Brest (FR)

(73) Assignee: Howmedica Osteonics Corp., Mahwah, NJ (US)

( * ) Notice: Subject to any disclaimer, the term of this patent is extended or adjusted under 35 U.S.C. 154(b) by 374 days.

(21) Appl. No.: 17/435,991

(22) PCT Filed: Mar. 18, 2020

(86) PCT No.: PCT/US2020/023345
§ 371 (c)(1),
(2) Date: Sep. 2, 2021

(87) PCT Pub. No.: WO2020/205245
PCT Pub. Date: Oct. 8, 2020

(65) Prior Publication Data
US 2022/0156942 A1  May 19, 2022

Related U.S. Application Data

(60) Provisional application No. 62/826,190, filed on Mar. 29, 2019.

(51) Int. Cl.
*G06T 7/10* (2017.01)
*G06T 7/00* (2017.01)
(Continued)

(52) U.S. Cl.
CPC ............ *G06T 7/149* (2017.01); *G06T 7/0012* (2013.01); *G06T 7/70* (2017.01); *G06T 2207/30008* (2013.01)

(58) Field of Classification Search
CPC ......... G06T 7/149; G06T 7/0012; G06T 7/70; G06T 2207/30008; G06T 2207/10072; G06T 2207/20124
See application file for complete search history.

(56) References Cited

U.S. PATENT DOCUMENTS 7,492,968 B2  2/2009  Jerebko et al.
8,884,618 B2  11/2014  Mahfouz
(Continued)

FOREIGN PATENT DOCUMENTS

CN      110796636 A    2/2020
JP      2007312971 A   12/2007
(Continued)

OTHER PUBLICATIONS

Machine translation for JP 2007-312971, IDS (Year: 2007).*
(Continued)

*Primary Examiner* — Qian Yang
(74) *Attorney, Agent, or Firm* — Shumaker & Sieffert, P.A.

(57) ABSTRACT

Techniques are described for closed surface fitting (CSF). Processing circuitry may determine a plurality of points on a shape, determine a contour, used to determine a shape of an anatomical object, from image information of one or more images of a patient, and determine corresponding points on the contour that correspond to the plurality of points on the shape based on at least one of respective normal vectors projected from points on the shape and normal vectors projected from points on the contour. The processing circuitry may generate a plurality of intermediate points between the points on the shape and the corresponding points on the contour, generate an intermediate shape based on plurality of intermediate points, and generate a
(Continued)

mask used to determine the shape of the anatomical object based on the intermediate shape.

34 Claims, 10 Drawing Sheets

(51) Int. Cl.
*G06T 7/149* (2017.01)
*G06T 7/70* (2017.01)

(56) References Cited

U.S. PATENT DOCUMENTS

| | | | |
|---|---|---|---|
| 8,971,606 B2 | 3/2015 | Chaoui et al. | |
| 9,111,180 B2 | 8/2015 | Rappaport et al. | |
| 9,218,524 B2 | 12/2015 | Wang et al. | |
| 9,495,752 B2 | 11/2016 | Wu et al. | |
| 9,646,229 B2 | 5/2017 | Sofka et al. | |
| 9,959,486 B2 | 5/2018 | Kiraly et al. | |
| 10,062,014 B2 | 8/2018 | Zhou et al. | |
| 10,438,350 B2 | 10/2019 | Patil et al. | |
| 10,482,603 B1 | 11/2019 | Fu et al. | |
| 10,580,131 B2 | 3/2020 | Mazo | |
| 10,582,907 B2 | 3/2020 | Chen et al. | |
| 10,769,791 B2 | 9/2020 | Song et al. | |
| 10,825,168 B2 | 11/2020 | Tegzes et al. | |
| 10,973,486 B2 | 4/2021 | Sjostrand et al. | |
| 11,055,851 B2 | 7/2021 | Novikov et al. | |
| 11,090,019 B2 | 8/2021 | Siemionow et al. | |
| 11,158,061 B2 | 10/2021 | De Winde | |
| 11,288,808 B2 | 3/2022 | Abramoff et al. | |
| 11,348,257 B2 | 5/2022 | Lang | |
| 11,386,988 B2 | 7/2022 | Johnsson et al. | |
| 11,423,540 B2 | 8/2022 | Heindl et al. | |
| 11,443,428 B2 | 9/2022 | Petersen et al. | |
| 11,449,993 B2 | 9/2022 | Book et al. | |
| 11,626,212 B2 | 4/2023 | Crawford et al. | |
| 11,657,508 B2 | 5/2023 | Richter et al. | |
| 11,682,117 B2 | 6/2023 | Fuchs et al. | |
| 2013/0216110 A1* | 8/2013 | Zheng | G06T 7/0012 382/128 |
| 2017/0270346 A1* | 9/2017 | Ascierto | G06T 7/0012 |
| 2018/0233222 A1 | 8/2018 | Daley et al. | |
| 2018/0240235 A1 | 8/2018 | Mazo | |
| 2018/0315188 A1 | 11/2018 | Tegzes et al. | |
| 2019/0105009 A1 | 4/2019 | Siemionow et al. | |
| 2020/0245960 A1 | 8/2020 | Richter et al. | |
| 2020/0311937 A1 | 10/2020 | Wang et al. | |
| 2020/0410687 A1 | 12/2020 | Siemionow et al. | |
| 2021/0019889 A1 | 1/2021 | Novikov et al. | |
| 2022/0051045 A1 | 2/2022 | Vandersmissen | |
| 2022/0058809 A1 | 2/2022 | Fuchs et al. | |
| 2022/0270762 A1 | 8/2022 | Crawford et al. | |

FOREIGN PATENT DOCUMENTS

| | | | |
|---|---|---|---|
| WO | WO 2017/186634 | * | 11/2017 |
| WO | 2022037696 A1 | | 2/2022 |

OTHER PUBLICATIONS

Notice of Intent to Grant from counterpart Japanese Application No. 2021-558615 dated Feb. 21, 2023, 5 pp.

Response to Office Action dated Sep. 13, 2022, from counterpart Japanese Application No. 2021-558615 filed Dec. 12, 2022, 17 pp.

Response to Communication Pursuant to Rules 161(1) and 162 EPC dated Nov. 8, 2021, from counterpart European Application No. 20718482.1, filed Apr. 22, 2022, 23 pp.

Office Action from counterpart Japanese Application No. 2021-558615 dated Sep. 13, 2022, 6 pp.

"Blueprint 3d Planning Software + PSI," Wright Medical Group, retrieved from https://www.wright.com/blueprint-3d-planning-psi-system on Oct. 15, 2020, 9 pp.

"HoloLens 2," Microsoft HoloLens, retrieved from https://www.microsoft.com/en-us/hololens, on Oct. 15, 2020, 5 pp.

Boissonnat, J.D., "Shape Reconstruction from Planar Cross Sections," Computer Vision, Graphics, and Image Processing, vol. 44, No. 1, Oct. 1988, 29 pp.

International Preliminary Report on Patentability from International Application No. PCT/US2020/023345, dated Oct. 14, 2021, 11 pp.

International Search Report and Written Opinion of International Application No. PCT/US2020/023345, dated Jun. 17, 2020, 18 pp.

ITK 4.11.0 Insight Segmentation and Registration Toolkit Itk:: BSplineScatteredDataPointSetToImageFilter<TInputPointSet, TOutputImage> Class Template Reference, retrieved from https://itk.org/Doxygen411/html/classitk_1_1BSplineScatteredDataPointSet-ToImageFilter.html on Jan. 18, 2022, 24 pp.

Lee et al., "Scattered Data Interpolation with Multilevel B-Splines," IEEE Transactions on Visualization and Computer Graphics, vol. 3, No. 3, Jul.-Sep. 1997, 17 pp.

Marker et al., "Contour-Based Surface Reconstruction using Implicit Curve Fitting, and Distance Field Filtering and Interpolation," Volume Graphics, Jan. 2006, 9 pp.

Nguyen et al., "A new segmentation method for MRI images of the shoulder joint," Fourth Canadian Conference on Computer and Robot Vision (CRV'07), May 2007, 8 pp.

Tustison et al., "N-D C? B-Spline Scattered Data Approximation," The Insight Journal, Aug.-Dec. 2005, 8 pp.

Wright Medical, "BluePrint Video-Wright Medical Announces the Acquisition of IMASCAP SAS", accessed from www.imascap.com/wp-content/uploads/2017/12/blueprintvid.mp4, Dec. 14, 2017, 9 pp.

Wright, "BluePrint, 3d Planning + PSI," User Manual V2.1, Tornier, CAW-8754, Nov. 2017, 18 pp.

Zoroofi et al., "Automated Segmentation of Acetabulum and Femoral Head From 3-D CT Images," IEEE Transactions on Information Technology in Biomedicine, vol. 7, No. 4, Dec. 2003, 15 pp.

* cited by examiner

CLOSED SURFACE FITTING FOR SEGMENTATION OF ORTHOPEDIC MEDICAL IMAGE DATA

This application is a national stage application under 35 U.S.C. § 371 of PCT Application No. PCT/US2020/023345, filed Mar. 18, 2020, which claims the benefit of U.S. Provisional Application No. 62/826,190 filed Mar. 29, 2019. The entire contents of each of PCT Application No. PCT/US2020/023345 and U.S. Provisional Application No. 62/826,190 are incorporated herein by reference in their entirety.

BACKGROUND

Surgical joint repair procedures involve repair and/or replacement of a damaged or diseased joint. A surgical joint repair procedure, such as joint arthroplasty as an example, may involve replacing the damaged joint with a prosthetic that is implanted into the patient's bone. Proper selection or design of a prosthetic that is appropriately sized and shaped and proper positioning of that prosthetic are important to ensure an optimal surgical outcome. A surgeon may analyze damaged bone to assist with prosthetic selection, design and/or positioning, as well as surgical steps to prepare bone or tissue to receive or interact with a prosthetic.

SUMMARY

This disclosure describes example techniques for the use of closed surface fitting (CSF) for segmentation of 3D image information to identify separation between anatomical objects to generate a mask that is applied to image data to determine location of anatomical objects. For instance, with the example techniques, a computing device may determine size and shape of one or more anatomical objects (e.g., humeral head). From image information (e.g., from computed tomography (CT) scans), due to limitations in resolution, it may be not be possible to determine boundaries between anatomical objects (e.g., where the humeral head ends and where the glenoid begins).

A computing device may be able to determine some level of separation between anatomical objects based on changes in intensity of voxels in the image data (e.g., based on Hessian) that occurs between anatomical objects. However, the voxel-based separation (e.g., separation based on changes in intensity of voxels) may be imperfect because there being gaps where it is unclear whether there is a separation between anatomical objects. For example, due to limitations in imaging modalities, some of the voxels may blend together or otherwise be missing resulting in gaps in the voxel-based separation.

This disclosure describes example techniques to perform segmentation (e.g., determine separation between anatomical objects) using close surface fitting (CSF) techniques to provide a viewable representation (e.g., virtual reality, mixed reality, or augmented reality) of the anatomical objects. A computing device may utilize a shape (e.g., a standard shape or a shape determined from modeling) and determine an initial location for that shape within the image data. For example, utilizing techniques described in more detail, the computing device may determine an initial estimate of where a particular anatomical object is located.

The computing device may also determine an initial contour based on the voxel-based separation. Again, the voxel-based separation may be imprecise, and there may be gaps in this initial contour.

The computing device may iteratively expand or contract, expand for some parts and contract for other parts, and expand and contract the shape based on distances between points on the shape and the contour. The result of the iterative process, described in more detail below, may be a mask used to identify which voxels in the image data correspond to the anatomical object. For example, the computing device may determine that all voxels of the image data that are within the mask and have an intensity greater than or equal to a threshold intensity value are voxels of an anatomical object. The computing device may then determine the size and shape of the anatomical object based on the voxels determined to be within the mask and having an intensity greater than or equal to the threshold intensity value.

In this manner, the example techniques may generate an accurate representation of the anatomical object in a way that addresses deficiencies in the imaging modalities. A surgeon or other medical professional may view the representation (e.g., the virtual reality, mixed reality, or augmented reality representation) of the anatomical object for determining subsequent steps (e.g., type of surgery, whether implant is needed, type of implant, etc.) prior to performing the surgery.

In one example, the disclosure describes a method for segmenting an anatomical object from image information, the method comprising determining a plurality of points on a shape, determining a contour, used to determine a shape of the anatomical object, from the image information of one or more images of a patient, determining corresponding points on the contour that correspond to the plurality of points on the shape based on at least one of respective normal vectors projected from points on the shape and normal vectors projected from points on the contour, generating a plurality of intermediate points between the points on the shape and the corresponding points on the contour, generating an intermediate shape based on plurality of intermediate points, and generating a mask used to determine the shape of the anatomical object based on the intermediate shape.

In one example, the disclosure describes a system for segmenting an anatomical object from image information, the system comprising a memory configured to store information for a shape and processing circuitry. The processing circuitry is configured to determine a contour, used to determine a shape of the anatomical object, from the image information of one or more images of a patient, determine corresponding points on the contour that correspond to the plurality of points on the shape based on at least one of respective normal vectors projected from points on the shape and normal vectors projected from points on the contour, generate a plurality of intermediate points between the points on the shape and the corresponding points on the contour, generate an intermediate shape based on plurality of intermediate points, and generate a mask used to determine the shape of the anatomical object based on the intermediate shape.

In one example, the disclosure describes a computer-readable storage medium storing instructions thereon that when executed cause one or more processors to determine a plurality of points on a shape, determine a contour, used to determine a shape of the anatomical object, from the image information of one or more images of a patient, determine corresponding points on the contour that correspond to the plurality of points on the shape based on at least one of respective normal vectors projected from points on the shape and normal vectors projected from points on the contour, generate a plurality of intermediate points between the points on the shape and the corresponding points on the contour, generate an intermediate shape based on plurality of intermediate points, and generate a mask used to determine the shape of the anatomical object based on the intermediate shape.

In one example, the disclosure describes a system for segmenting an anatomical object from image information, the system comprising means for determining a plurality of points on a shape, means for determining a contour, used to determine a shape of the anatomical object, from the image information of one or more images of a patient, means for determining corresponding points on the contour that correspond to the plurality of points on the shape based on at least one of respective normal vectors projected from points on the shape and normal vectors projected from points on the contour, means for generating a plurality of intermediate points between the points on the shape and the corresponding points on the contour, means for generating an intermediate shape based on plurality of intermediate points, and means for generating a mask used to determine the shape of the anatomical object based on the intermediate shape.

The details of various examples of the disclosure are set forth in the accompanying drawings and the description below. Various features, objects, and advantages will be apparent from the description, drawings, and claims.

DETAILED DESCRIPTION

Figure 1:
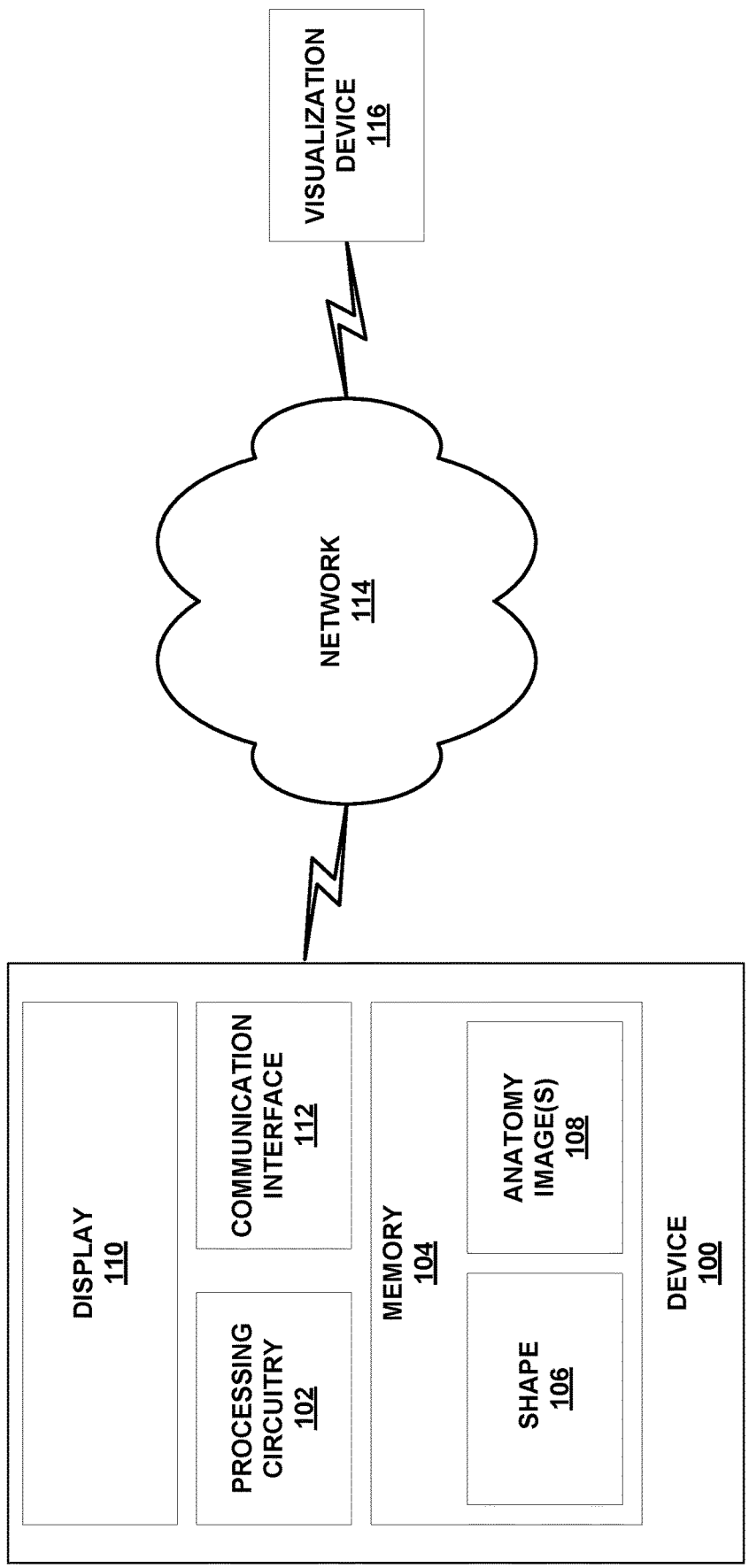
FIG. 1 is a block diagram illustrating an example computing device that may be used to implement the techniques of this disclosure.

This disclosure describes example techniques to perform closed surface fitting to determine the shape of an anatomical object such as a bony anatomical or a soft-tissue anatomical object (e.g., muscle tissue). A human patient may suffer from a disease that causes damage to the patient anatomy, or the patient may suffer an injury that causes damage to the patient anatomy. For shoulders, as an example of patient anatomy, a patient may suffer from primary glenoid humeral osteoarthritis (PGHOA), rotator cuff tear arthropathy (RCTA), instability, massive rotator cuff tear (MRCT), rheumatoid arthritis (RA), post-traumatic arthritis (PTA), osteoarthritis (OA), or acute fracture, as a few examples.

To address the disease or injury, a surgeon performs a surgical procedure. For a shoulder, for example, a surgeon may perform Reversed Arthroplasty (RA), Augmented Reverse Arthroplasty (RA), Standard Total Shoulder Arthroplasty (TA), Augmented Total Shoulder Arthroplasty (TA), or Hemispherical surgeries, as a few examples. There may be benefits for the surgeon to determine, prior to the surgery, characteristics (e.g., size, shape, and/or location) of the patient anatomy. For instance, determining the characteristics of the patient anatomy may aid in prosthetic selection, design and/or positioning, as well as planning of surgical steps to prepare a surface of the damaged bone to receive or interact with a prosthetic. With advance planning, the surgeon can determine, prior to surgery, rather than during surgery, steps to prepare bone or tissue, tools that will be needed, sizes and shapes of the tools, the sizes and shapes of other characteristics of one or more prostheses that will be implanted, and the like.

Part of the surgical planning may involve determination of the size and shape of an anatomical object (e.g., humeral head as one example). For example, with a proper determination of the size and shape of the anatomical object, the surgeon may be able to determine how the anatomical object should be prepared so that an implant can be implanted, as one example. For instance, with the size and shape information of the anatomical object, the surgeon may plan to cut or shave parts of the anatomical object to prepare the anatomical object for receiving an implant. As another example, with a proper determination of the size and shape of the anatomical object, the surgeon may be able to determine the size and shape of the implant that is to be implanted. For instance, for larger sized anatomical objects a first set of implants may be suitable but for smaller sized anatomical objects a second set of implants may be suitable.

In general, by having size and shape information of the anatomical object, the surgeon can visualize the patient's anatomy and allow for the anatomical object to be segmented out from the result of the nearby tissue and bone. With pre-operative visualization, the surgeon can plan for the surgical process and select the right tools to utilize.

To determine the size and shape, a clinician or surgeon may take a plurality of scans (e.g., images) of the patient such as computer tomography (CT) scans to produce image information, such as 3D image information. The CT scans may provide the surgeon with a relatively complete view of the patient anatomy. However, there may be limitations. For instance, the surgeon may view two-dimensional (2D) images of the CT scans but three-dimensional (3D) images may be preferable.

In general, CT works by passing focused X-rays through the body and measuring the amount of the X-ray energy absorbed. The amount of X-ray energy absorbed by a known slice thickness is proportional to the density of the body tissue. By taking many such measurements from many angles, the tissue densities can be composed as a cross-sectional image using a computing device. The computing device generates a grey scale image where the tissue density is indicated by shades of grey.

The Hounsfield scale is a quantitative scale for describing radiodensity in medical CT and provides an accurate density for the type of tissue. On the Hounsfield scale, air is represented by a value of −1000 (black on the grey scale) and bone between +700 (cancellous bone) to +3000 (dense bone) (white on the grey scale). As bones are much denser than surrounding soft tissues, they show up very clearly in CT images. This makes CT an important imaging modality when investigating skeletal anatomy.

Similarly, the density difference between soft tissues and air is great allowing, for example, the nasal airways to be clearly seen. Soft tissues and organs represent narrow Hounsfield value ranges and are therefore more difficult to differentiate between adjacent structures, such as between fat and muscle when viewing and segmenting CT data. Artificial contrast agents that absorb X-ray energy may be introduced into the body, which makes some structures stand out more strongly in CT images.

Due to limitations on the resolution, it may be difficult to distinguish separate anatomical objects simply by looking at the CT scans, and the surgeon may prefer a more robust 3D viewable model of the human patient anatomy. Moreover, the CT scans may be imperfect, and there may be holes or protrusions in the images that complicate the determination of patient anatomy.

In addition, it may be difficult to assess the 3D anatomy based on 2D images or imperfect 3D models. The anatomy assessment and the bone wear assessment are more reliable to be analyzed in 3D. The 3D assessment of anatomy and wear need to identify reliable anatomic landmarks.

Accordingly, there may be technical limitations in the viewable information that is available to the surgeon from CT scans. This disclosure describes closed surface fitting (CSF) techniques for segmentation of a 3D image to classify anatomical objects. CSF techniques are important to generate more reliable 3D visualization and better 3D surfaces. As described above, having a more reliable 3D visualization and better 3D surfaces allows ease of surgical planning and allows for more accurate surgical planning.

The technique may include fitting a closed surface object to a patient anatomical object represented by image information from the one or more images (e.g., CT scans) to generate a mask (e.g., a three-dimensional mask) that is used to determine information indicative of the shape, size and/or, location of the patient anatomical object. For example, voxels from the CT scans that have a sufficiently high intensity and fit within the mask are voxels that belong to a particular anatomical object, and anatomical objects can be separated out. That is, it can be determined where one anatomical object ends and another beings, which may be blurred in the image data from the CT scans.

In this way, the example techniques are may be used to perform segmentation of the image data to produce a 3D representation of the anatomical object. The example techniques provide a practical application whereby the example techniques generate information indicative of the shape, size and/or of the patient anatomical object. Using this information, the surgeon can better plan a repair or replacement surgery to address the patient injury or disease.

As described in more detail, in one or more examples, a computing device may determine a shape that is used to determine the size, shape, and/or location of the anatomical object. As one example, the shape may be a 3D volume represented by a graphical shape volume that the computing device defines as a point cloud. As one example, the point could may be vertices of a plurality of primitives (e.g., triangles) interconnected together and rasterized to form the shape. For instance, the computing device may define the vertices of the primitives and define interconnection of vertices of a primitive with vertices of other primitives to form the shape. A point cloud being vertices of primitives is merely one example and should not be considered limiting.

Also, the shape being a 3D volume is merely one example. In some examples, the shape may be a 2D surface (e.g., 2D contour or 2D wireframe), and the example techniques may be applied to image information from 2D image slices. The result of the example techniques described in the disclosure on the 2D image slices may be a series of 2D shapes that represent the anatomical object. The series of 2D shapes may then be combined for form a 3D representation of the anatomical object. For ease, this disclosure describes techniques for a 3D volume, but the techniques are not so limited.

In the case of segmentation to produce a 3D volume representing an anatomical object (e.g., humeral head), the shape may be selected to be a sphere because a sphere is a rough approximation of the humeral head. As another example, the shape may be a statistical mean shape (e.g., statistical shape model (SSM)) of a bone or soft-tissue anatomical object. For instance, a database may store statistical shape model data (e.g., as images or parameters) representing mean shapes of bone or soft-tissue anatomical objects and the shape may be a shape obtained from the statistical shape model data.

In general, any closed surface (e.g., pyramid, tore, cube, etc.) may be utilized. For example, several shapes and models would be used to represent one anatomical object. Each anatomical part of a specific anatomical object would be represented using one modeling element (functional models, free shape modeling, active shape modeling, morphological modeling, Ellipsoid, etc.). For example, a sphere could be used for the humeral head, a cylinder could be used for the diaphysis, a free shape could be used for osteophytes, etc.

In some examples, there may be one shape that is used for all patients. For instance, one shape may represent the mean shape of a particular anatomical object, and this one shape may be used for all patients as a starting shape for determining the size, shape, and/or location of the anatomical object. In some examples, there may be different selectable mean shapes for an anatomical object based on patient characteristics such as gender, height, age, etc. A computing device or surgeon may select a particular mean shape of the anatomical object as a starting shape for determining the size, shape, and/or location. There may be other ways in which to select the shape that is to be used, and the example techniques are not limited to a particular manner in which to select the shape that is to be used as a starting shape for segmentation of an anatomical object.

The sphere may be an adequate representation of the humeral head, and therefore, SSM of the humeral head may not be needed for segmentation of the humeral head, although SSM may be used for segmentation of the humeral head. For other bony anatomical objects, an SSM may be used for segmentation since a sphere or other simple closed surface may not adequately represent such bony anatomical objects. Also, in some examples, although a sphere or other simple closed surface may be used for segmentation, for soft tissue, an SSM may be better suited because of the different size, shapes, and types of soft tissue.

In one or more examples, the shape volume may have a closed surface. A closed surface is a delimitation of a subset of the Euclidian space being closed (that is, containing all its limit points) and bounded (that is, having all its points lie within some fixed distance of each other). For instance, a closed surface is a surface where two levels of derivative can be applied on any point. As one example, a closed surface contains a volume of space that is enclosed from all directions. A sphere is one example of a closed surface because it contains a volume of space that is enclosed from all directions.

In one or more examples, the computing device may estimate a location of a particular anatomical object from image information from scans taken of the patient (e.g., 3D point cloud from points in multiple 2D CT slices). For example, for the humeral head, the computing device may detect one or more substantially spherical objects from the 2D CT slices. For example, the computing device may perform an initial segmentation operation, described in more detail, to determine anatomical objects in the patient. The computing device may detect one or more substantially spherical objects from the initial segmentation operation. As one example, the computing device may utilize the 3D point cloud from points in the multiple 2D CT slices to detect one or more substantially spherical objects from the 2D CT slices.

Another way in which to determine an estimate of a location of a particular anatomical object (e.g., humeral head) is based on detecting a spherical contour and computing its gradient. The computing device may determine a gradient of the 3D image information. For example, for a spherical contour, in its computed gradient, all the gradient lines will converge to the sphere center. This process is referred to as "Hough sphere computation." A technique referred to as "Hough transform" is used to detect lines in 2D images. In one or more examples, the computing device may utilize gradients in the 3D image information to determine where the gradients converge (e.g., Hough sphere computation) to detect a sphere in 3D images.

The computing device may assign a score to each detected spherical object (e.g., based on whether the size of the detected spherical object is approximately the size of a mean humeral head, whether the location of the detected spherical object is approximately where the humeral head would be located in the patient, etc.). Based on the score and the proximity of the detected spherical object to neighboring anatomy, the computing device may detect a region corresponding to the humeral head in the 3D image information.

With an initial detection of a region of the anatomical object (e.g., based on determination of spherical objects), the computing device may be configured to perform a closed surface fitting (CSF) segmentation algorithm to determine a mask that is used to more accurately determine the size, shape, and location of the anatomical object. The CSF segmentation algorithm may be an iterative process of expanding, contracting, or expanding in some portions and contracting (e.g., expanding and contracting) in other portions the shape used to represent the anatomical object within the region of the anatomical object.

As an example, the computing device may determine, based on the image information, where there is separation between anatomical objects. As one example, the computing device may determine where there is separation based on changes in voxel intensities (e.g., voxel-based separation). One example of voxel-based separate techniques is based on generating a Hessian feature image of the CT scan (e.g., the Hessian feature image is one example of the voxel-based separation information indicative of separation between anatomical objects). The Hessian feature image indicates regions of the CT image data having higher intensity gradients between two or more voxels. For instance, the computing device may compute $2^{nd}$ derivatives between neighboring voxels to determine the gradients between the voxels and generate the Hessian feature image based on the $2^{nd}$ derivatives.

The Hessian feature image may show separation between two anatomical objects because there is a change in intensity between voxels of bony objects and soft tissue, between two sets of bony objects that are next to one another, and between two sets of soft tissue that are next one another. The computing device may determine a contour based on the voxel-based separation information (e.g., based on the Hessian feature image).

Although the contour is indicative of separation between anatomical objects, the contour may not provide a complete shape of the anatomical objects. For example, due to imaging imperfections, there may be holes or other errors in the contour. As one example, the contour may be not be complete and may not be a closed surface representing an anatomical object. In general, the contour may provide an initial estimation of the size, shape, and location of an anatomical object. However, as described in more detail, because the contour is based on image information, and the 2D scans may be imperfect, the contour may be an imprecise indicator of the actual anatomical object (e.g., due to holes or other missing portions, as well as protrusions in the contour).

The computing device may fit the shape (e.g., closed surface) to the contour (e.g., which is based on the separation between anatomical objects). Because the shape is a closed surface, by fitting the shape to the contour, the computing device may generate a fitted-closed surface that forms as a mask to determine whether voxels in the image data belong to the anatomical object. For example, for voxels having a sufficiently high intensity that are within in the mask, the computing device may determine that such voxels are for the anatomical object as a way to construct information indicative of the size, shape, and location of the anatomical object. Voxels outside the mask or voxels inside the mask but not having a sufficiently high intensity may not be considered as being part of the anatomical object.

In this manner, the computing device may utilize closed surface fitting (CSF) to determine separation between anatomical objects (e.g., segmentation of anatomical objects). The example techniques may be useable for humeral head and scapula segmentation and soft tissue segmentation.

As one example, for CSF segmentation, the computing device may determine points on the shape (e.g., the sphere for humeral head or the SSM for other anatomical objects) and determine a normal vector to be projected from each of the points. The normal vector projected from a point may be orthogonal to a plane that is tangential to the shape at the point and projects from the point towards a contour of an anatomical object of the patient anatomy.

The computing device may determine where the normal vector for the point intersects the contour of the anatomical object. The point on the contour where the normal vector intersects is referred to as the intersection point on the contour of the anatomical object. The computing device may determine a normal vector to be projected from the intersection point similar to the manner in which the computing device determined the normal vector to be projected from the point on the shape.

In some examples, the computing device may also determine normal vectors for a set of points (e.g., N points) that are proximate to the intersection point. The set of points may be on the contour, but the techniques are not so limited.

The computing device may determine angular differences between a portion of the normal vector, projected from the point on the shape, that extends through the intersection point on the contour and beyond the contour, and the normal vector projected from each point of the set of points. As described above, the normal vector that projects from the point on the shape (e.g., a first normal vector) is orthogonal to a plane tangential to the shape at the point, and the normal vector that projects from a point of the set of points (e.g., a second normal vector) is orthogonal to a plane tangential to the contour at the point. The second normal vector may be computed based on an image gradient computation or with Hessian feature image to extract local variation direction from the image. For example, the image gradient computation or with the Hessian feature image, the computing device may determine the plane tangential to the contour at the point. Therefore, the first normal vector and the second normal vector need not necessarily be aligned, and there may be an angular difference between the portion of the first normal vector extending from through the intersection point and the second normal vector extending from the intersection point.

The computing device may determine which point of the set of points has a normal vector with angular difference less than a threshold value, including the example of determining which point on the set of points has a normal vector with the least angular difference, with the normal vector of the point on the shape. The computing device may identify the determined point on the contour as the corresponding point to the point on the shape.

In one or more examples, the computing device may determine a distance between the point on the shape and the corresponding point on the contour. The computing device may deform the shape so that the point in the shape extends towards the corresponding point on the contour. For example, the CSF segmentation is an iterative process, and accordingly, the computing device may move the point on the shape by a fraction of the distance between the point and the corresponding point on the contour and in the direction of the corresponding point on the contour. As one example, the computing device may move the point on the shape so that the point is approximately halfway to the corresponding point on the contour.

The above example techniques are described with respect to one point on the shape. The computing device may perform similar operations on a plurality of other points on the shape (e.g., determine normal vectors, intersection points on contour from normal vectors, determine proximate points, determine normal vectors for proximate points and intersection points, and determine corresponding points as those which normal vectors having angular difference less than threshold such as minimum angular difference). As one example, there may be approximately 10,000 points on the closed surface on which the computing device performs its operations.

The computing device may determine corresponding points on the contour for respective points on the shape. The computing device may then extend out the points on the shape towards their respective corresponding points (e.g., over multiple iterations) on the contour such that the points on the shape are a fraction of the distance towards the contour over each iteration until the last iteration. In some examples, in addition to extending outwards, the corresponding points may be located within the shape, and therefore, the computing device may contract the shape towards the contour.

In the above example, the computing device extended out the points on the shape towards respective corresponding points. However, for some points on the shape, there may not be a corresponding point. For example, due to holes in the contour, it is a possible that a vector from a point on the shape does not intersect the contour. In one or more examples, even points on the shape with no correspondences (e.g., no corresponding point) are extended. These points on the shape with no correspondences follow the displacement of the other points with correspondences. For instance, the computing device may be configured to perform a b-spline registration algorithm, and in the b-spline registration algorithm, points on the shape with no corresponding point are displaced (e.g., extended) based on an amount by which other points on the shape having corresponding points are displaced.

The computing device may iteratively repeat the above example operations. For instance, after deforming the shape in the manner described above, the result may be a first intermediate shape. The computing device may repeat the above operations on the first intermediate shape to generate a second intermediate shape, and so forth for N iterations. The resulting shape after the N iterations may be a 3D mask (e.g., fitted-closed surface). The computing device may utilize the 3D mask (e.g., fitted-closed surface) to determine which voxels in the image data are for the anatomical object and output information indicative of anatomical object based on the determination.

As described in more detail below, during the first few iterations, the computing device may extend the vectors from the points on the shape a greater distance than for later iterations to identify corresponding points on the contour. In the first few iterations, for each point on the shape for which there is a corresponding point, the computing device may extend (e.g., displace) the point a fraction of the distance (e.g., halfway) towards the corresponding point. In extending the point, in the first few iterations, the computing device may keep an elasticity value for the point on the shape low. The elasticity value is a factor that indicates by how much just the point extends.

For example, for a high elasticity value, just the point would extend towards its corresponding point creating a bulge or a narrow peak where the point extended towards its corresponding point. For a low elasticity value, not only does the point extend towards its corresponding point, but the curvature of the shape changes forming a more rotund shape rather than narrow peak. For instance, a point extending based on a high elasticity value can be conceptually thought of as forming a narrow and thin Gaussian curve with fast roll off. A point extending based on a low elasticity value can be conceptually thought of as forming a wider Gaussian curve with a slow roll off.

Accordingly, for the first few iterations, the computing device may utilize relatively long vectors, where over the iterations the size of vectors becomes smaller, to identify corresponding points on the contour. The computing device may extend the points towards the corresponding points by extending the curvature of the shape according to the movement of the points towards the corresponding points (e.g., by having a low elasticity value in performing the operations to extent the point).

During later iterations, the computing device may not utilize relatively long vectors to identify corresponding points on the contour. Rather, the computing device may utilize relatively short vectors to identify corresponding points on the contour. This may be because the shape has been deformed from the earlier iterations to be an approximate fit to the contour and now smaller adjustments are needed to better fit the shape to the contour. For these later iterations, to ensure better fit of the shape to the contour, the computing device may utilize a larger elasticity value to cause the point to better fit the curvature of the contour.

Accordingly, in the first iterations, the computing device uses low elasticity and high research distance (e.g., length of vector used to identify corresponding points on contour) in order to have a rough fitting of the shape to the contour. In further iterations, the computing device increases elasticity and research distance is diminished in order to fit the shape (e.g., closed surface) accurately to the contour.

As described above, the result of these example operations may be a mask that is used to determine the shape of the anatomical object. For instance, voxels that are within the mask and with sufficiently high intensity values belong to the anatomical object. Accordingly, with the mask, the computing device may determine which voxels in the image data belong to the anatomical object and which ones do not. The computing device may then generate information indicative of the shape of the anatomical object based on the determined voxels within the mask having sufficiently high voxel intensity. With the information indicative of the shape of the anatomical object, the surgeon may be able to determine the tools to use, if any shaping of the anatomical object is needed (e.g., preparation of anatomical object for implant), size and shape of implant to use, where to insert the implant, and the like as examples of pre-operative planning. Since information of the shape, which includes location, of the anatomical object may be useful to the surgeon, the example techniques describe ways in which to determine shape of the anatomical object in a way that overcomes limitations of imaging modalities and other techniques.

FIG. 1 is a block diagram illustrating an example computing device that may be used to implement the techniques of this disclosure. FIG. 1 illustrates device 100, which is an example of a computing device configured to perform one or more example techniques described in this disclosure.

Device 100 may include various types of computing devices, such as server computers, personal computers, smartphones, laptop computers, and other types of computing devices. Device 100 includes processing circuitry 102, memory 104, and display 110. Display 110 is optional, such as in examples where device 100 is a server computer.

Examples of processing circuitry 102 include one or more microprocessors, digital signal processors (DSPs), application specific integrated circuits (ASICs), field programmable gate arrays (FPGAs), discrete logic, software, hardware, firmware or any combinations thereof. In general, processing circuitry 102 may be implemented as fixed-function circuits, programmable circuits, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Processing circuitry 102 may include arithmetic logic units (ALUs), elementary function units (EFUs), digital circuits, analog circuits, and/or programmable cores, formed from programmable circuits. In examples where the operations of processing circuitry 102 are performed using software executed by the programmable circuits, memory 104 may store the object code of the software that processing circuitry 102 receives and executes, or another memory within processing circuitry 102 (not shown) may store such instructions. Examples of the software include software designed for surgical planning.

Although processing circuitry 102 is illustrated as being within device 100, the example techniques are not so limited. In some examples, processing circuitry 102 represents the circuitry in different devices that are used together to perform the example techniques described in this disclosure. Therefore, processing circuitry 102 may be configured as processing circuitry of a system configured to perform the example techniques described in this disclosure. However, in some examples, processing circuitry 102 may be processing circuitry that is local to device 100.

Memory 104 may be formed by any of a variety of memory devices, such as dynamic random access memory (DRAM), including synchronous DRAM (SDRAM), magnetoresistive RAM (MRAIVI), resistive RAM (RRAM), or other types of memory devices. Examples of display 110 include a liquid crystal display (LCD), a plasma display, an organic light emitting diode (OLED) display, or another type of display device.

Device 100 may include communication interface 112 that allows device 100 to output data and instructions to and receive data and instructions from visualization device 116 via network 114. For example, after determining information for an anatomical object, using closed surface fitting (CSF) segmentation techniques described in this disclosure, communication interface 112 may output information of the anatomical object to visualization device 116 via network 114. A surgeon may then view a graphical representation of the anatomical object with visualization device 116.

Communication interface 112 may be hardware circuitry that enables device 100 to communicate (e.g., wirelessly or using wires) to other computing systems and devices, such as visualization device 116. Network 114 may include various types of communication networks including one or more wide-area networks, such as the Internet, local area networks, and so on. In some examples, network 114 may include wired and/or wireless communication links.

Visualization device 116 may utilize various visualization techniques to display image content to a surgeon. Visualization device 116 may be a mixed reality (MR) visualization device, virtual reality (VR) visualization device, holographic projector, or other device for presenting extended reality (XR) visualizations. In some examples, visualization device 116 may be a Microsoft HOLOLENS™ headset, available from Microsoft Corporation, of Redmond, Washington, USA, or a similar device, such as, for example, a similar MR visualization device that includes waveguides. The HOLOLENS™ device can be used to present 3D virtual objects via holographic lenses, or waveguides, while permitting a user to view actual objects in a real-world scene, i.e., in a real-world environment, through the holographic lenses.

Visualization device 1116 may utilize visualization tools that are available to utilize patient image data to generate three-dimensional models of bone contours to facilitate preoperative planning for joint repairs and replacements. These tools allow surgeons to design and/or select surgical guides and implant components that closely match the patient's anatomy. These tools can improve surgical outcomes by customizing a surgical plan for each patient. An example of such a visualization tool for shoulder repairs is the BLUEPRINT™ system available from Wright Medical Technology, Inc. The BLUEPRINT™ system provides the surgeon with two-dimensional planar views of the bone repair region as well as a three-dimensional virtual model of the repair region. The surgeon can use the BLUEPRINT™ system to select, design or modify appropriate implant components, determine how best to position and orient the implant components and how to shape the surface of the bone to receive the components, and design, select or modify surgical guide tool(s) or instruments to carry out the surgical plan. The information generated by the BLUEPRINT™ system is compiled in a preoperative surgical plan for the patient that is stored in a database at an appropriate location (e.g., on a server in a wide area network, a local area network, or a global network) where it can be accessed by the surgeon or other care provider, including before and during the actual surgery.

As illustrated, memory 104 stores shape 106. Shape 106 may be a graphical surface image that defines a 3D volume. Shape 106 may be is defined as 3D point cloud. As one example, the 3D point cloud may define a plurality of interconnected primitives (e.g., triangles) to form a particular shape. Shape 106 may be a three-dimensional (3D) shape, but the example techniques described in this disclosure may be applicable to examples where shape 106 is a two-dimensional (2D) shape (e.g., 2D contour or 2D wireframe) as well.

As one example, shape 106 may be a sphere formed as a 3D point cloud (e.g., the 3D point cloud are vertices of a plurality of interconnected primitives). As another example, shape 106 may be a mean anatomy shape. For example, shape 106 (e.g., that represents a 3D volume) may represent the average shape of an anatomical object from a database of anatomical objects. For instance, a database may store information about the size and shape of an anatomical object for a plurality of patients, given particular patient statistics. Shape 106 may be an average of the size and shapes of the anatomical object over a plurality of patients having similar characteristics (e.g., height, age, gender, etc.). There may be other ways in which to determine an average shape of the anatomical object such as examples where the average shape is an average across various patients, even if patients do not have similar characteristics.

Although one shape 106 is illustrated, memory 104 may store a plurality of shapes. Storing of shape 106 or plurality of shapes may refer to memory 104 storing parametric or other information that can be used to form the shapes. For instance, memory 104 may store information to form plurality of spheres having different sizes. As another example, memory 104 may store information to form means shapes for different anatomical objects (e.g., different bony structures like bones in the shoulder, hip, or ankle or different soft tissues such as different muscles). For ease of description only, the example techniques are described with respect to shape 106 being a sphere; however, the example techniques may be extended to other examples of shape 106, such as SSM or other shapes that are good approximations for anatomical objects. For example, the shapes used as approximations for anatomical objects may include shapes generated from functional models, free shape modeling, active shape modeling, morphological modeling, ellipsoids, surface meeting methods (SFMs), total curvature methods (TCMs), and curve fitting methods (CFMs) as a few examples.

In general, shape 106 may be examples of closed surfaces (e.g., sphere, pyramid, tore, cube, etc.). For example, several shapes and models would be used to represent one anatomical object. Each anatomical part of a specific anatomical object would be represented using one modeling element (functional models, free shape modeling, active shape modeling, morphological modeling, Ellipsoid, etc.). For example, a sphere could be used for the humeral head, a cylinder could be used for the diaphysis, a free shape could be used for osteophytes, etc.

In examples described in this disclosure, when memory 104 or computing device 100 is described as storing shape 106, memory 104 or computing device 100 may be considered as storing information from which processing circuitry 102 can graphically construct shape 106 (e.g., by rendering the shape directly using point information or indirectly using parametric information). As one example, shape 106 may include coordinates for the vertices of the primitives that form shape 106 and interconnection of the primitives. In some examples, operations on shape 106 may be considered as operations on the point cloud that used to form shape 106 such as vertices of primitives that form shape 106. Shape 106 may be defined using implicit representations as well (e.g., based on equations defining the shape).

Shape 106 defines a closed surface. As described above, a closed surface is a delimitation of a subset of the Euclidian space being closed (that is, containing all its limit points) and bounded (that is, having all its points lie within some fixed distance of each other). For instance, a closed surface is a surface where two levels of derivative can be applied on any point. As one example, a closed surface contains a volume of space that is enclosed from all directions. A sphere is one example of a closed surface because it contains a volume of space that is enclosed from all directions. There may be other examples of closed surface (e.g., cubes, pyramids, etc. are examples of closed surfaces).

In one or more examples, anatomy scans 108 may be image scans of anatomy of the patient, which may be stored as 2D image information or 3D volumetric image information. The patient may have an injured shoulder requiring surgery, and for the surgery or possibly as part of the diagnosis, the surgeon may have requested anatomy scans 108 to plan the surgery. A computing device (like device 100 or some other device) may generate segmentations of the image information so that the surgeon can view the size, shape, and interconnection of anatomical objects with other anatomical objects of the patient anatomy needing surgery.

The following describes example techniques to perform an initial segmentation of the image information to generate viewable anatomical objects. One example technique for the initial segmentation is described in U.S. Pat. No. 8,971,606. As one example, the bones of the patient may be determined from an automated segmentation process where processing circuitry 102 or another system determines the bones based on intensity values of the patient-specific image data (e.g., from scans 108). From these bones, processing circuitry 102 may identify insertion points, or attachment points, for one or more soft tissue structures of interest for the shoulder joint. For example, an insertion supraspinatus indicates where the supraspinatus muscle is attached to a humeral head, an insertion infraspinatus indicates where the infraspinatus muscle is attached to the humeral head, and an insertion subscapularis indicates where the subscapularis muscle is attached to the humeral head. Processing circuitry 102 may identify each of these insertion points based on comparison to an anatomical atlas or other instruction based on general human anatomy. In some examples, processing circuitry 102 may determine additional insertion points on the scapula or other bones as additional points for registering the initial shape to the bones of the patient.

In the above example, processing circuitry 102 is described as generating the initial segmentation. In some examples, processing circuitry 102 may receive the initial segmentation, where the operations of the initial segmentation are performed by some other computing device. In this disclosure, processing circuitry 102 may determine the initial segmentation which includes examples where processing circuitry 102 generates the initial segmentation and examples where processing circuitry 102 receives the initial segmentation.

As described in more detail, the initial segmentation may not be needed in all examples. For instance, the initial segmentation may be one way in which to determine a contour that is used for closed surface fitting (CSF) techniques described in this disclosure. However, there may be other ways to determine the contour in addition to or instead of the initial segmentation, such as using Hessian feature image (e.g., which relies on $2^{nd}$ order derivatives to determine voxel intensity gradients), described in more detail, or based on the voxel intensities directly.

Anatomy scan 108 may provide the surgeon with different 2D images of the patient anatomy (e.g., a human patient). From the 2D images, it may be possible to generate a 3D volume of anatomical objects. However, the imaging modality used to generate anatomy scan 108 may be imperfect, or the operations used to generate the initial segmentation may be imperfect. Therefore, the initial segmentation of the anatomical objection may not provide the surgeon with a proper representation of the anatomical object.

In some examples, it may be possible to compare voxel intensity of voxels in a 3D representation, generated from image information of scan 108, to determine an approximation of location of anatomical object. For example, there may be change in the voxel intensity around a boundary of an anatomical object (e.g., voxel intensity of voxels inside the anatomical object is different than voxel intensity voxels outside the anatomical object). However, due to imperfections in the imaging modalities, portions of anatomical objects may be missing. Also, checking voxel intensities to determine the shape of the anatomical object may require a substantial number of calculations given the relatively large number of voxels present in the 3D volume.

As another example, processing circuitry 102 may be configured to determine a Hessian feature images from the image information of the one or more images of scans 108. For instance, processing circuitry 102 may generate the Hessian feature images or receive the Hessian feature images. The Hessian feature image indicates regions of the image information having higher intensity gradients between two or more voxels. For instance, processing circuitry 102 may compute $2^{nd}$ derivatives between neighboring voxels to determine the gradients between the voxels and generate the Hessian feature image based on the $2^{nd}$ derivatives. The regions of the image information having the higher intensity gradients may be indicative of locations where there is separation between anatomical objects (e.g., separation between two or more bony anatomies, separation between bony anatomy and soft tissue, and/or separation between two or more soft tissues). However, due to imperfections in the imaging modalities, there may be gaps in the Hessian feature images such that the Hessian feature images are insufficient to provide all information to accurately identify the size and shape of anatomical objects.

Therefore, there may be limitations in the ability of the surgeon to fully understand the size and shape of the patient anatomy, prior to surgery, relying on initial segmentation, voxel intensities, and/or Hessian feature images. This disclosure describes example techniques that processing circuitry 102 may perform to generate information indicative of the anatomical object (e.g., bone of a patient). For instance, the result of the example techniques may be a graphical model of the anatomical object (e.g., parameters from which an accurate representation of the anatomical object can be rendered). The surgeon may use the information indicative of the anatomical object (e.g., such as size and shape) to better plan the type of surgery to perform. Moreover, in examples where the information indicative of the anatomical object is the graphical model, the surgeon may be able to wear visualization device 116 to visualize the patient anatomy. For instance, the surgeon, wearing visualization device 116 may interact with the graphical model (e.g., turn it in different directions) to visualize the entirety of the patient anatomy in a 3D space. Also, the techniques provide an accurate segmentation of the anatomical object for the surgeon to review.

In one or more examples, to generate the information indicative of the anatomical object, processing circuitry 102 may deform shape 106 so that shape 106, after deformation, approximately fits a contour. As one example, the contour may be the contour of the initial segmentation of the anatomical object. As one example, the contour may be the contour determined from changes in the voxel intensity. As one example, the contour may be in the separation of two anatomical objects (e.g., between two anatomical objects). For example, the contour may be in the middle of the region indicated by the Hessian feature images.

As described above, there may be missing portions in the contour or the contour may be incomplete because of the time intensive nature of voxel intensity comparisons. Hence, shape 106 may need to be fitted to the contour to generate a fitted-closed surface. This fitted-closed surface may be a mask that is used to determine which voxels in the image information of the one or more images of scans 108 represent portions of the anatomical object. In this way, based on the fitted-closed surface (e.g., the mask), processing circuitry 102 may be configured to determine which voxels represent the anatomical object as a way to determine a size and shape of the anatomical object.

As described in more detail below, the deformation may be an iterative operation where processing circuitry 102 determines points on shape 106 and normal vectors to those points on shape 106 to determine the fitted-closed surface. Processing circuitry 102 may determine where the normal vectors intersect the contour in images from scans 108. The points where the normal vectors intersect the contour of the patient anatomy are referred to as intersection points. Processing circuity 102 may compare angular differences between the normal vectors for points on shape 106 and normal vectors for the intersection points and points proximate to the intersection points on the contour of the anatomical object.

Based on angular differences, processing circuitry 102 may determine a corresponding point on the contour, and generate an intermediate shape based on the corresponding points on the contour and the points on the shape. Processing circuitry 102 may iteratively repeat these operations starting with the intermediate shape until processing circuitry 102 determines an instance of the intermediate shape that fits the contour (e.g., fits within a threshold including examples of exact fits). The resulting shape (e.g., fitted-closed surface)

may be the mask used to determine which voxels in the image information of the one or more images are for the anatomical object.

In some examples, the example techniques may be applied to specific anatomical objects such as humeral head or specific soft tissue. However, the example techniques are not so limited. The example techniques may be performed with various types of anatomical objects. Examples of the anatomical objects include the coracoid process, acromion, diaphysis, condyles, capitellum, trochlea, clavicle, femur, tibia, patella, fibula, calcaneus, talus, and navicular.

Figure 2:
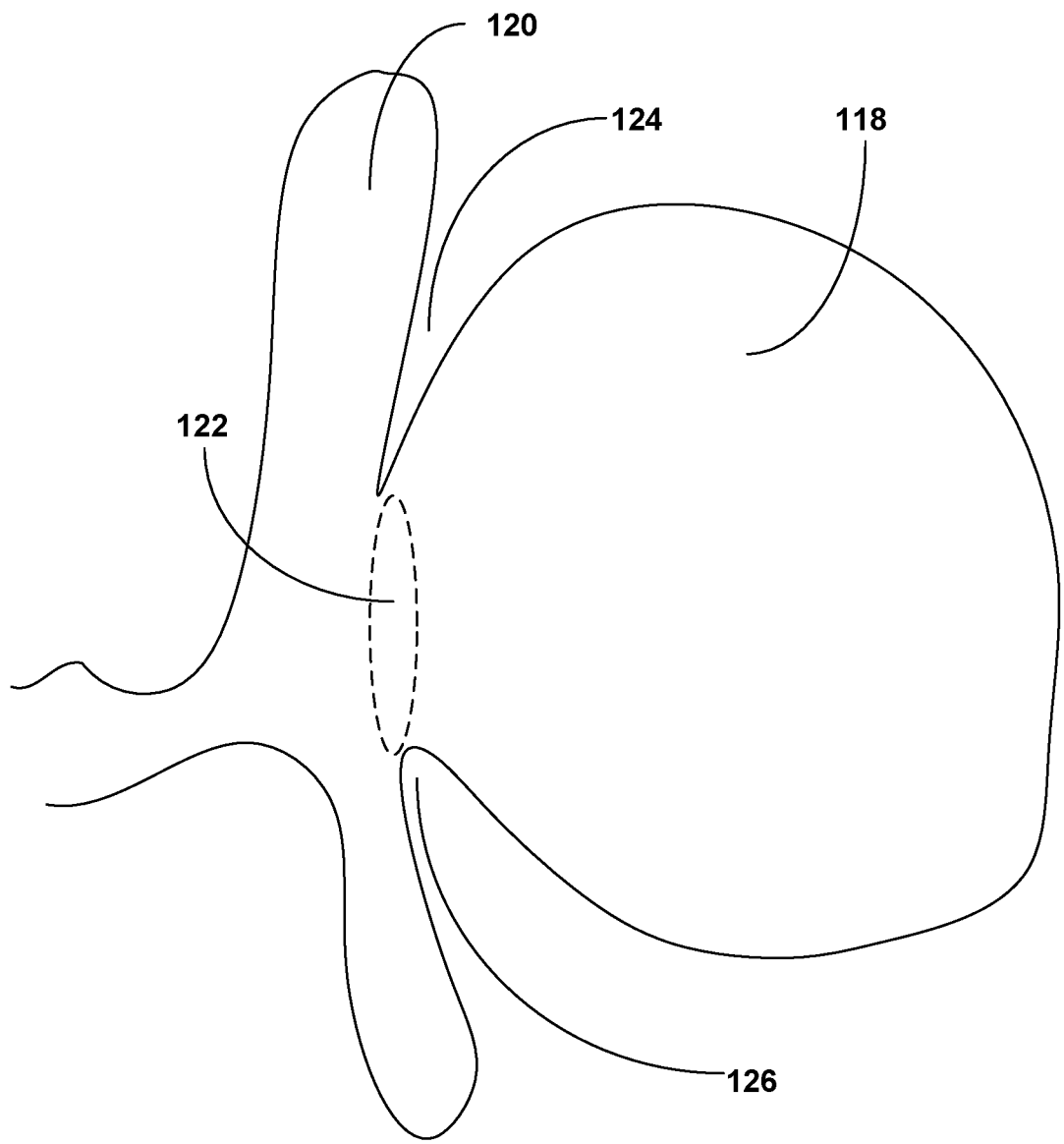
FIG. 2 is a conceptual diagram illustrating an example of a shape in image data generated from a medical imaging scan of patient anatomy.

FIG. 2 is a conceptual diagram illustrating an example of a shape in image data generated from a medical imaging scan of patient anatomy. For instance, FIG. 2 illustrates an example of image from scans 108. In the example, FIG. 2 illustrates humeral head 118 and glenoid 120. Although the general shape and location of humeral head 118 and glenoid 120 can be determined in the example of FIG. 2, there may be portions where, due to limitations of imagining modality the separation between humeral head 118 and glenoid 120 may not be clear. Because the separation between humeral head 118 and glenoid 120 is not clear, it may be difficult to determine the actual size and shape of humeral head 118.

For example, in portion 122, portion 124, and portion 126, it may be unclear whether glenoid 120 ends and humeral head 118 begins. As one example, due to limitations in the imaging modalities, it may be unclear whether voxels in the image belong to glenoid 120 or humeral head 118. The resolution may be insufficient to capture voxels having lower voxel intensity, such as in portions separating humeral head 118 and glenoid 120, to determine separation between glenoid 120 and humeral head 118.

Figure 3:
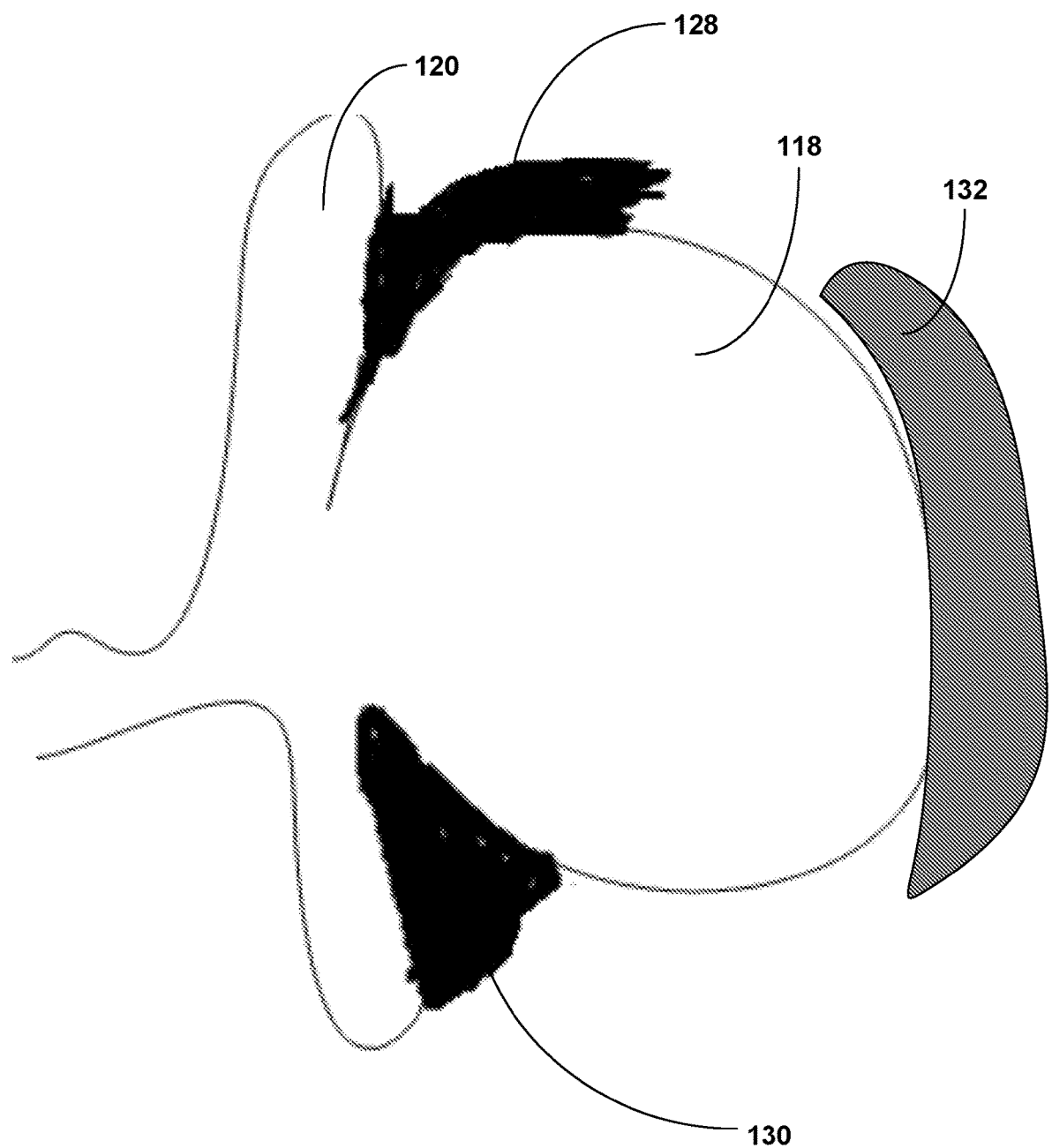
FIG. 3 is a conceptual diagram illustrating an example of a separation between anatomy determined from voxel-based separation.

FIG. 3 is a conceptual diagram illustrating an example of a separation between anatomy determined from voxel-based separation. For instance, one example of the voxel-based separation is based on Hessian feature image. As one example, processing circuitry 102 may determine $2^{nd}$ order derivatives to determine a gradient in changes of voxel intensities in voxels. FIG. 3 illustrates a Hessian feature image of the example of FIG. 2. Where there are changes in the voxel intensities, such as in portions 124 and 126 in FIG. 2, processing circuitry 102 may determine regions 128 and 130. Also, region 132, from the Hessian feature image, is shown in FIG. 3 to illustrate that there may be additional regions indicating gradient changes in voxel intensities. In some examples, some other processing circuitry may perform the image analysis to generate the Hessian feature image and output the information of the Hessian feature image to processing circuitry 102. In both examples (e.g., where processing circuitry 102 generates the Hessian feature image or where processing circuitry 102 receives the Hessian feature image), processing circuitry 102 may be considered as determining the Hessian feature image.

It should be noted that utilizing the Hessian feature image is not necessary in all examples. For instance, in examples where the contour to which shape 106 is fitted to generate the fitted-closed surface is based on the separation of anatomical objects, the Hessian feature image may be utilized. In examples where the contour is based on initial segmentation or just absolute voxel intensity, the Hessian feature image may not be needed. In some examples, a combination of the Hessian feature image and initial segmentation or absolute voxel intensity may be utilized to determine the contour to which shape 106 is fitted by processing circuitry 102. Simply for ease of illustration, the examples are described with respect to the contour being within separation of anatomical objects (e.g., based on Hessian feature image as one example way to determine separation of anatomical objects). However, the example techniques are not so limited.

Figure 4:
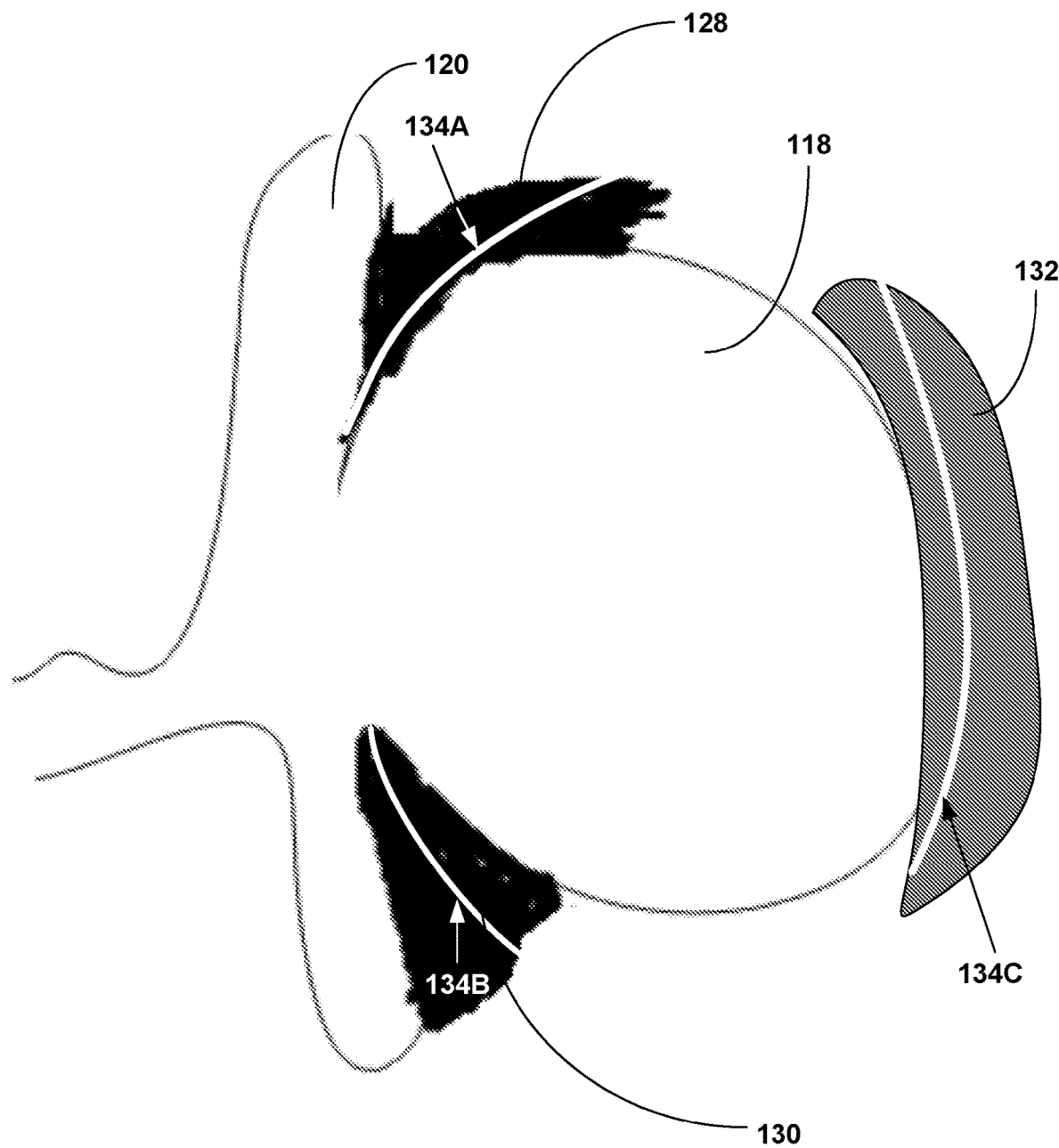
FIG. 4 is a conceptual diagram illustrating an initial contour based on the separation between anatomy determined in FIG. 3.

FIG. 4 is a conceptual diagram illustrating an initial contour based on the separation between anatomy determined in FIG. 3. FIG. 4 illustrates contour 134 that includes contour portion 134A, contour portion 134B, and contour portion 134C. As illustrated, there are gaps in contour 134, such as between contour portions 134A and 134B, between contour portions 134B and 134C, and between contour portions 134A and 134C. FIG. 4 is a conceptual diagram to ease with understanding, and the gaps in contour 134 may not necessarily be as large as illustrated, although having such large gaps is possible.

Processing circuitry 102 may determine contour 134 utilizing various techniques. As one example, processing circuitry 102 may determine a line through the middle of regions 128, 130, and 132, and form contour 134 (e.g., each one of contour portions 134A, 134B, and 134C) based on the line that is through the middle of regions 128, 130, and 132. As another example, processing circuitry 102 may determine a skeleton line through regions 128, 130, and 132. A skeleton line refers to a line through regions 128, 130, and 132 having points that are all the same distance away from an edge of respective ones of regions 128, 130, and 132. Processing circuitry 102 may form contour 134 (e.g., each one of contour portions 134A, 134B, and 134C) based on the skeleton line through regions 128, 130, and 132. There may be various ways in which to processing circuitry 102 may determine a line through regions 128, 130, and 132 (e.g., separation between glenoid 120 and humeral head 118) such as based on middle or skeleton lines, and the techniques are not limited to these examples. The line through regions 128, 130, and 132 formed using the various ways is an example of contour 134.

In examples where separation between anatomical objects is not used, contour 134 may be based on absolute voxel intensities or based on initial segmentation. In such examples, contour 134 may not be located within the separation, as illustrated in FIG. 4. Rather, contour 134 may be closer to the boundary of humeral head 118. However, even in such examples, contour 134 may include gaps and not be sufficiently precise to provide an accurate representation of the anatomical object (e.g., humeral head).

The above describes one example way in which to determine contour 134. There may be other example ways in which to determine contour 134. For instance, processing circuitry 102 may determine contour 134 based on changes in intensity between pixels or voxels in the image information of scans 108, where such changes in intensity indicate an edge or boundary. For instance, processing circuitry 102 may evaluate a line of pixel or voxel intensity values starting from one end of one of the image information from scans 108 to the other end and compare the intensity values to one or more threshold values. If processing circuitry 102 determines that there is substantial change in the intensity (e.g., increase or decrease in intensity), processing circuitry 102 may determine that there is an edge or border of the anatomical object where the change in intensity occurred. In some examples, processing circuitry 102 may use a multi-voxel, 3D filter mask to identify the edge. However, such a technique may be more complex than comparing individual voxel intensities to a threshold.

As processing circuitry 102 evaluates intensity values, processing circuitry 102 may determine another substantial change in the intensity (e.g., decrease in intensity if there was a previous increase, or increase in intensity if there was a previous decrease). In this case, processing circuitry 102 may determine that processing circuitry 102 reached an opposite edge or border of the anatomical object. In some examples, the regions of the image information corresponding to bone will typically have higher intensity values than non-bone areas.

As described above, for the CSF techniques, processing circuitry 102 may determine an initial location of shape 106. Based on the initial location of shape 106, processing circuitry 102 may iteratively deform shape 106 to fit the contour (e.g., contour 134).

Figure 5:
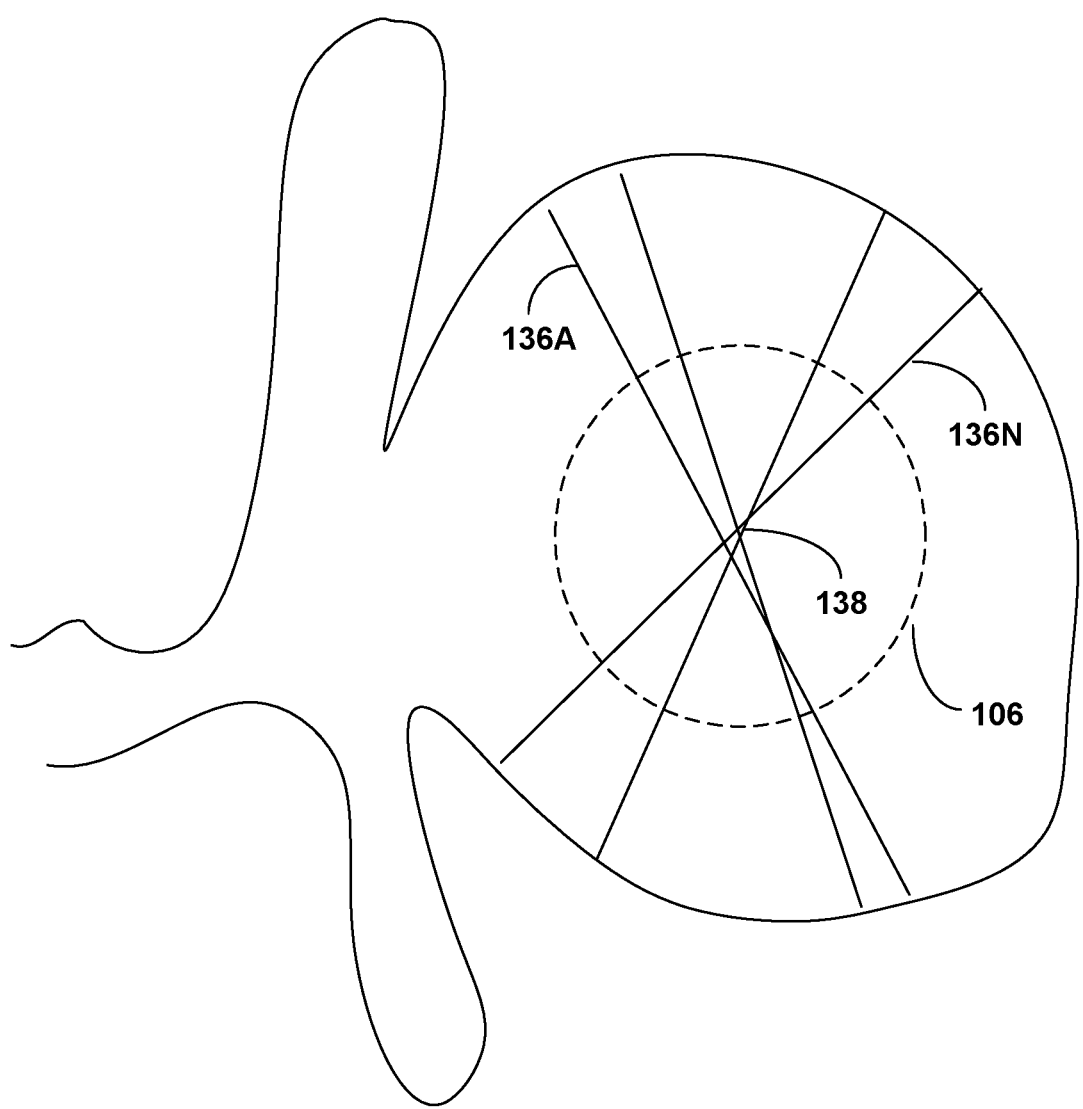
FIG. 5 is a conceptual diagram illustrating an example manner in which to determine an initial location for a shape for closed surface fitting (CSF) techniques.

FIG. 5 is a conceptual diagram illustrating an example manner in which to determine an initial location for a shape for closed surface fitting (CSF) techniques. In one or more examples, processing circuitry 102 may be configured to identify one or more shapes, such as approximately spherical shapes in the case of a humeral head, in image information of scans 108, and for each identified spherical shape, processing circuitry 102 may assign the approximately spherical shape a score indicating the likelihood that the substantially spherical shape is humeral head 118.

As one example, processing circuitry 102 may be configured to perform a variation of the Hough transform to detect spherical shapes in the 3D image. For instance, processing circuitry 102 may determine gradient vectors for points in the 3D image. The gradient vectors are vectors that are orthogonal (e.g., perpendicular) to the level surface. The gradient vectors may also be considered as normal vectors.

As illustrated in FIG. 5, processing circuitry 102 may determine gradient vectors 136A to 136N. For ease, gradient vectors 136A to 136N are shown in the part where humeral head 118 resides, but processing circuitry 102 may determine gradient vectors in other portions of the image as well. A location where a plurality of the gradient vectors intersect one another may be indicative of there being a spherical shape and the location may be indicative of a center of the spherical shape. For example, FIG. 5 illustrates location 138 where plurality of gradient vectors 136A to 136N intersect one another, and location 138 may be the center of a spherical shape. Processing circuitry 102 may repeat such operations to identify a plurality of spherical shapes.

Processing circuitry 102 may determine a score of each identified approximately spherical shape based on factors such as the size of the approximately spherical shape and shapes of objects proximate to the spherical shape. As one example, processing circuitry 102 may determine, for all voxels located on the spherical shape, a dot product between the vector from the spherical shape center (e.g., location 138) to the voxel and the gradient vector (e.g., one of gradient vectors 136A to 136N) at the voxel. The score of each spherical shape is the sum of all dot products.

As some more examples, if processing circuitry 102 identifies an approximately spherical shape having a size that is far larger or far smaller than a typical size of humeral head 118, or is not close to an object expected to be nearby (such as glenoid 120 in the case of identifying the humeral head), processing circuitry 102 may assign the spherical shape a low score. Also, if processing circuitry 102 determines that a spherical shape is proximate to an object having a shape similar to that an object expected to be nearly, such as glenoid 120 in the case of identifying the humeral head 118, and that the size of the spherical shape is within an expected range, processing circuitry 102 may assign the approximately spherical shape a high score.

It should be noted that the above example for approximately spherical shape is used with respect to humeral head 118. However, the example techniques are not so limited. In some examples, the techniques may be performed for various anatomical objects such as glenoid 120, soft tissue such as rotator cuff muscle from different perspectives, and other bony and soft tissue anatomical objects. Where the above example techniques of identifying approximately spherical shapes to identify humeral head 118 is not available, the initial segmentation techniques may be utilized.

Based on the scores, processing circuitry 102 may determine which of the spherical shape represents the location of humeral head 118. Processing circuitry 102 may then center shape 106 at the center location of the spherical shape that represents the location of humeral head 118. For example, as illustrated in FIG. 5, processing circuitry 102 may set the location of shape 106 centered at location 138. In this manner, processing circuitry 102 may determine an initial location of shape 106 (e.g., as illustrated in FIG. 5) and determine contour 134 (e.g., as described above). Processing circuitry 102 may then deform shape 106 to fit shape 106 to contour 134.

Figure 6:
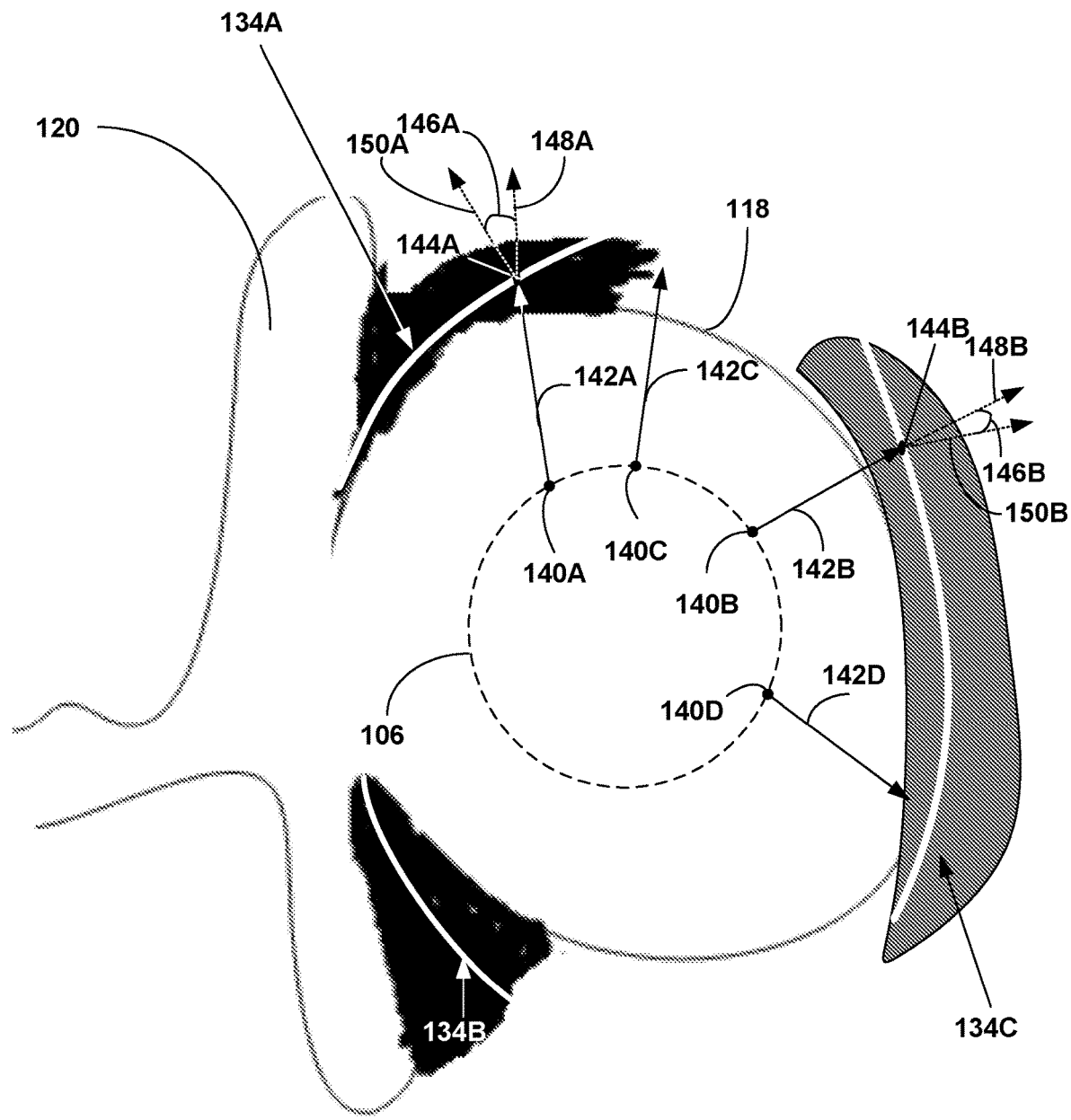
FIG. 6 is a conceptual diagram illustrating an example of a shape in image data obtained from a medical imaging of patient anatomy and corresponding points on a contour for points on the shape.

FIG. 6 is a conceptual diagram illustrating an example of a shape in image data obtained from a medical imaging of patient anatomy and corresponding points on a contour for points on the shape. FIG. 6 illustrates an example of patient anatomy such as glenoid 120 and humeral head 118. Humeral head 118 is connected to the humerus (not shown in FIG. 6). For ease of illustration, the example techniques are described with respect to humeral head 118; however, the example techniques should not be considered limited. The example techniques may be applicable to other bony structures and non-bony structures such as soft tissue of the patient, as well as anatomical objects associated with other anatomy such as ankles, hips, knees, elbows, wrists, etc.

For ease of illustration, the example techniques are described in 2D perspective. However, the techniques may be performed in 3D space. For example, although FIG. 6 and the other figures illustrate a 2D perspective, such techniques may be considered as being applicable to a 3D volume.

In some examples, the example techniques may be applied to individual 2D scans that are then combined together to form a 3D model of the anatomical object (e.g., humeral head 118). In the example of FIG. 6, the example techniques are applied to a 3D image obtained from multiple 2D scans (e.g., scans 108), such as CT scans of the patient anatomy.

As described above, in example techniques described in this disclosure, processing circuitry 102 may deform shape 106, through an iterative process, to generate a fitted-closed surface that forms as a mask to determine which voxels are for the anatomical object to determine an accurate representation of the size and shape of an anatomical object (e.g., humeral head 118 in the example of FIG. 6). Processing circuitry 102 may be configured to initially orient shape 106. For example, FIG. 6 illustrates shape 106 oriented within humeral head 118 in accordance with the example described above with respect to FIG. 5

In FIG. 5, shape 106 is shown as initially being oriented such that shape 106 does not intersect contour 134. However, in some examples, shape 106 may cross over contour 134 such that part of shape 106 is outside humeral head 118 and part of shape 106 is within humeral head 118. The example techniques described in this disclosure may be applicable even where part of shape 106 is outside actual contour 134 and part of shape 106 is within actual contour 134.

Processing circuitry 102 may be configured to determine a plurality of points on shape 106. The plurality of points may be based on 3D point cloud. As one example, the plurality of points may be vertices of primitives that define the shape of shape 106. FIG. 2 illustrates four points on shape 106: point 140A, point 140B, point 140C, and point 140D. The number of points on shape 106 and the location of shape 106 may be a design choice that processing circuitry 102 determines based on various factors such as dimensions, volume, and characteristic landmarks of anatomical object. In some examples, the number of points should be so that the distance between two points is lesser than the minimal local deformation on shape 106. There may be a plurality of points distributed at various location across or around shape 106, and four points is used for ease of illustration and description.

As illustrated in FIG. 6, processing circuitry 102 may determine normal vectors for each of the points (e.g., normal vector that project from the points). For instance, processing circuitry 102 may determine normal vector 142A for point 140A, normal vector 142B for point 140B, normal vector 142C for point 140C, and normal vector 142D for point 140D. To determine normal vectors 142A-142D, processing circuitry 102 may determine respective planes that are tangential to shape 106 at the respective points 140A-140D. Processing circuitry 102 may then determine vectors starting from respective points 140A-140D that are orthogonal to the respective tangential planes. The result may be normal vectors such as vectors 142A-142D shown in the example of FIG. 6.

Processing circuitry 102 may extend normal vectors 142A-142D towards contour 134 based on a certain maximum distance. As described in more detail, this maximum distance may be greater for earlier iterations of deforming shape 106 and shorter for later iterations of deforming shape 106. In some examples, it may be possible that contour 134 is further than the maximum distance of a normal vector for a point on shape 106. In some examples, it may be possible that, due to a gap in contour 134, a normal vector for a point on shape 106 does not intersect contour 134.

For example, as illustrated in FIG. 6, normal vector 140A and normal vector 140B intersect contour 134 at intersection points 144A and 144B, respectively. The points at which normal vectors intersect contour 134 are referred to as intersection points. However, normal vector 142C does not intersect contour 134 because there is a gap in contour 134. Also, even with normal vector 142D being its maximum size, contour 134 is still further than the end point of normal vector 142D.

In accordance with one or more examples, processing circuitry 102 may determine normal vectors from the intersection points on contour 134 (e.g., normal vectors that project from the intersection points). For instance, similar to above, processing circuitry 102 may determine a tangential plane to contour 134 at the intersection point and determine a vector that is orthogonal to the plane tangential to contour 134 and starts at the intersection point. As illustrated in FIG. 6, processing circuitry 102 may determine normal vector 150A for intersection point 144A and determine normal vector 150B for intersection point 144B.

Processing circuitry 102 may be configured to determine an angular difference between each of normal vectors 142A and 142B with respective ones of normal vectors 150A and 150B. To determine the angular difference, processing circuitry 102 may determine extended normal vectors that are normal vectors 142A and 142B extended beyond contour 134. For example, extended normal vector 148A is normal vector 142A extended beyond contour 134. Extended normal vector 148B is normal vector 142B extended beyond contour 134.

Each of the respective extended normal vectors 148A and 148B may have the same angular orientation as normal vectors 142A and 142B. Therefore, an angular difference between normal vectors 148A, 148B and 150A, 150B is the same as the angular difference between normal vectors 142A, 142B and 150A, 150B. The angular difference may be 3D angle, and therefore, relative to the x, y, and z axes.

For example, processing circuitry 102 may determine angular difference 146A, which is the angle between normal vector 150A and extended normal vector 148A. However, because extended normal vector 148A is oriented the same as normal vector 142A, angular difference 146A is the angular difference between normal vector 150A and normal vector 142A. Processing circuitry 102 may similarly determine angular difference 146B as the angular difference between normal vector 150B and extended normal vector 148B, which is the same as the angular difference between normal vector 150B and normal vector 142B.

In one or more examples, in addition to determining the angular differences with normal vectors of respective intersection points 144A and 144B, processing circuitry 102 may determine normal vectors for a set of points (e.g., on contour 134 but not so limited) that are proximate to respective ones of intersection points 144A and 144B. As one example, processing circuitry 102 may determine a set of points proximate to intersection point 144A. For each point in the set of points, processing circuitry 102 may determine a normal vector similar to the example techniques described above.

Also, for each normal vector, processing circuitry 102 may determine the angular difference between normal vectors and normal vector 142A. For example, processing circuitry 102 may shift extended normal vector 148A so that extended normal vector 148A starts from the same starting point as a normal vector for a point that is proximate to intersection point 144A. Processing circuitry 102 may determine an angular difference between the shifted extended normal vector and the normal vector for the point that is proximate to intersection point 144A.

Processing circuitry 102 may determine which one of the normal vectors has the angular difference less than a threshold (e.g., smallest angular difference) relative to normal vector 142A. Processing circuitry 102 may determine the point on contour 134 for which the angular difference for the normal vector is less than the threshold. This point on contour 134 may be a corresponding point to point 140A.

For example, for each of the points on shape 106 having a normal vector that intersects contour 134, processing circuitry 102 may determine a corresponding point. The corresponding point may be the intersection point on contour 134 or may be a point proximate to the intersection point (e.g., within 10 mm of the intersection point). The corresponding point may have the characteristic that the angular difference between the normal vector of the corresponding point and the point on shape 106 is less than a threshold value (e.g., smallest of the determined angular differences for the point on shape 106). For example, the corresponding point to point 140A may be intersection point 144A or a point proximate to intersection point 144A. The corresponding point to point 140B may be intersection point 144B or a point proximate to intersection point 144B.

Figure 7:
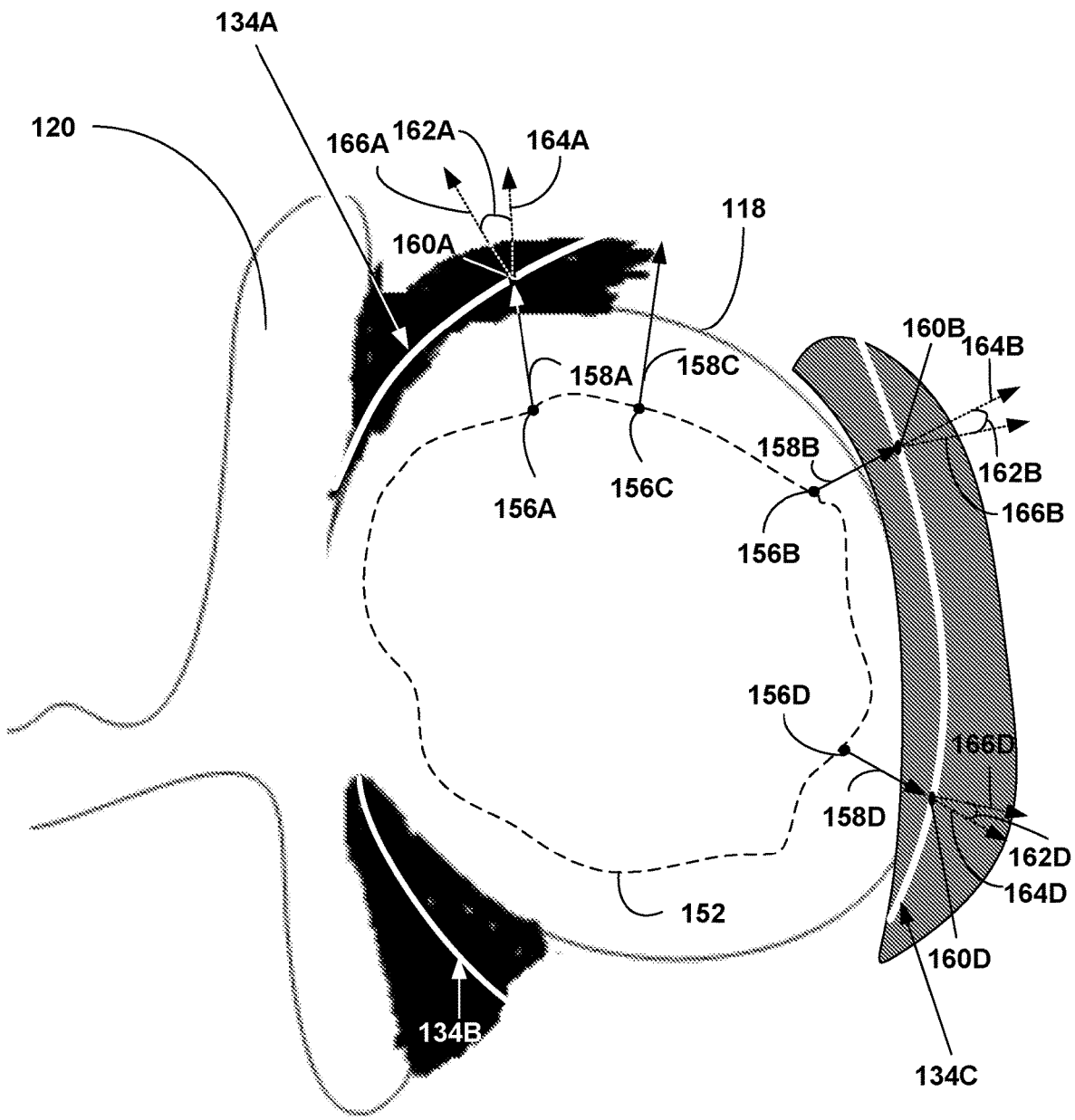
FIG. 7 is a conceptual diagram illustrating an example of a shape deformed to form an intermediate shape.

FIG. 7 is a conceptual diagram illustrating an example of a shape deformed to form an intermediate shape. In the example illustrated in FIG. 7, processing circuitry 102 may deform shape 106 to form intermediate shape 152. As described in more detail, intermediate shape 152 may be the result of an iteration of the iterative process used to deform shape 106 to fit contour 134. Therefore, intermediate shape 152 may be considered as an instance of shape 106 from the result of an iteration of the iterative process.

For example, as part of the iterative process to fit an instance of shape 106 (e.g., a deformed version of shape 106) to contour 134, processing circuitry 102 may extend shape 106 in the direction of contour 134. As one example, processing circuitry 102 may extend points 140A and 140B of FIG. 6 in the direction of their corresponding points on contour 134 (e.g., points with angular difference that is less than threshold).

To extend points 140A and 140B towards their corresponding points, processing circuitry, during a first iteration, processing circuitry 102 may move points 140A and 104B towards their corresponding points on contour 134 using a non-rigid registration. An example of the non-rigid registration is the b-spline registration. One example way in which to processing circuitry 102 performs the b-spline registration is described in Lee et. al "Scattered Data Interpolation with Multilevel B-Splines" IEEE Transactions on Visualization and Computer Graphics, Vol. 3, No. 3, July-September 1997. Additional example ways in which to perform the b-spline registration may be found in https://itk.org/Doxygen411/html/classitk_1_1BSplineScatteredDataPointSetToImageFilter.html and http://www.insight-journal.org/browse/publication/57.

In the b-spline registration, processing circuitry 102 may utilize the corresponding points on contour 134 as a way in which to try and have points on shape 106 (e.g., points 104A and 104D) reach contour 134. In some examples, the actual distances of vectors 142A and 142B may not be used to determine by how much to move points 140A and 140B. For example, processing circuitry 102 may utilize the maximum distances for vectors 142A and 142B to determine the corresponding points on contour 134. After that, the b-spline registration may move points 140A and 140B towards their corresponding points.

In some examples, even though no corresponding points were found for points 140C and 140D, the b-spline registration may result in points 140C and 140D also moving towards contour 134. For example, the amount by which points 140C and 140D move towards contour 134 may be based on how far neighboring or nearby points extend towards contour 134. For instance, if point 140A was extend 10 mm towards contour 134, point 140C may be extended 8 mm towards contour 134. Similarly, processing circuitry 102 may extend point 140D towards contour 134 based on an amount by which processing circuitry 102 extended nearby points on shape 106. In this way, with b-spline registration, points on shape 106 with corresponding points on contour 134 move in the direction of contour 134 and other points on shape 106 without corresponding points on contour 134 also end up moving in the direction of contour 134.

Using b-spline registration is one way in which to extend points 140A-140D. There may be other ways to extend points 140A-140D. For example, to extend points 140A-140D towards their corresponding points, during a first iteration, processing circuitry 102 may extend points 140A-140D to a fraction of the distance toward contour 134. For example, processing circuitry 102 may determine a length of normal vectors 140A and 140B, where the length is indicative of the distance from shape 106 to contour 134. In one example, processing circuitry 102 may determine the smallest length from the lengths of normal vectors 140A and 140B. As one example, assume that the length of normal vector 142A is the smallest length.

In this example, processing circuitry 102 may determine a fraction of the length of normal vector 142A (e.g., half of the length, although other fractions are possible). Processing circuitry 102 may then extend point 140A towards its corresponding point on contour 134 so that point 140A is at the fractional distance to contour 134 (e.g., halfway to contour 134). Processing circuitry 102 may similarly move point 140B. For points 140C and 140D, processing circuitry 102 may move points 140C and 140D based on an amount by which processing circuitry 102 move nearby points.

Intermediate shape 152 may result from the completion of one iteration of the iterative process to fit a shape to contour 134 to determine a mask used to identify voxels for humeral head 118. Processing circuitry 102 may repeat operations similar to those described above but starting with intermediate shape 152, providing further expansion of the shape 106.

For example, FIG. 7 illustrates points 156A-156D on intermediate shape 152. Similar to FIG. 6, processing circuitry 102 may determine normal vectors 158A-158D for respective points 156A-156D. In some examples, the maximum distances that normal vectors 158A-158D can extend to determine intersection points on contour 134 may be less than the maximum distances that normal vectors 142A-142D could be extended. In some examples, for first set of iterations to deform shape 106, the maximum distance that the normal vectors can extend may be greater than the maximum distance that the normal vectors can extend in later iterations.

As illustrated in FIG. 7, processing circuitry 102 may determine intersection point 160A for vector 158A and intersection point 160B for vector 156B. Also, although vector 142D for point 140D did not intersect contour 134 after movement of point 140D towards point 156D, point 156D may be close enough that vector 158D does intersect contour 134 at intersection point 160D. Similar to point 140C, vector 158C for point 156 does not intersect contour 134 because there is a gap in contour 134.

Processing circuitry 102 may determine a corresponding point on contour 134 for point 156A similar to the manner in which processing circuitry 102 determined the corresponding point on contour 134 for point 140A of FIG. 6. Processing circuitry 102 may determine extended vector 164A and normal vector 166A to intersection point 160A and normal vectors of points proximate to intersection point 160A. Processing circuitry 102 may determine angular differences between extended vector 164A and the normal vectors. For example, angular difference 162A illustrates the angular difference between vector 166A and 164A. Based on the angular difference that is less than a threshold (e.g., minimal difference), processing circuitry 102 may determine the corresponding point for point 156A.

Processing circuitry 102 may similarly determine corresponding points on contour 134 for point 156B and 156D. For example, for point 156B, processing circuitry 102 may utilize normal vector 158B, extended vector 164B, normal vector 166B to intersection point 160B (with angular different 162B), and normal vectors to points proximate to intersection point 160B to determine the corresponding point (e.g., point with normal vector with least angular difference with vector 158B). For point 156D, processing circuitry 102 may utilize normal vector 158D, extended vector 164D, normal vector 166D to intersection point 160D (with angular different 162D), and normal vectors to points proximate to intersection point 160D to determine the corresponding point (e.g., point with normal vector with least angular difference with vector 158D).

In some examples, processing circuitry 102 may utilize the b-spline registration to extend points 156A-156D towards contour 134 to complete another iteration of deforming shape 106. In some examples, processing circuitry 102 may utilize the lengths of vectors 158A, 158B, and 158D as a way to extend points 156A-156D towards contour 134 to complete another iteration of deforming shape 106. In both of these examples, intermediate shape 152 is generated from shape 106, and intermediate shape 152 is further deformed to generate a new intermediate shape, which may be further deformed to iteratively generate new intermediate shapes until an instance of the intermediate shape is the fitted-closed surface (e.g., that is an approximate fit to contour 134).

Figure 8:
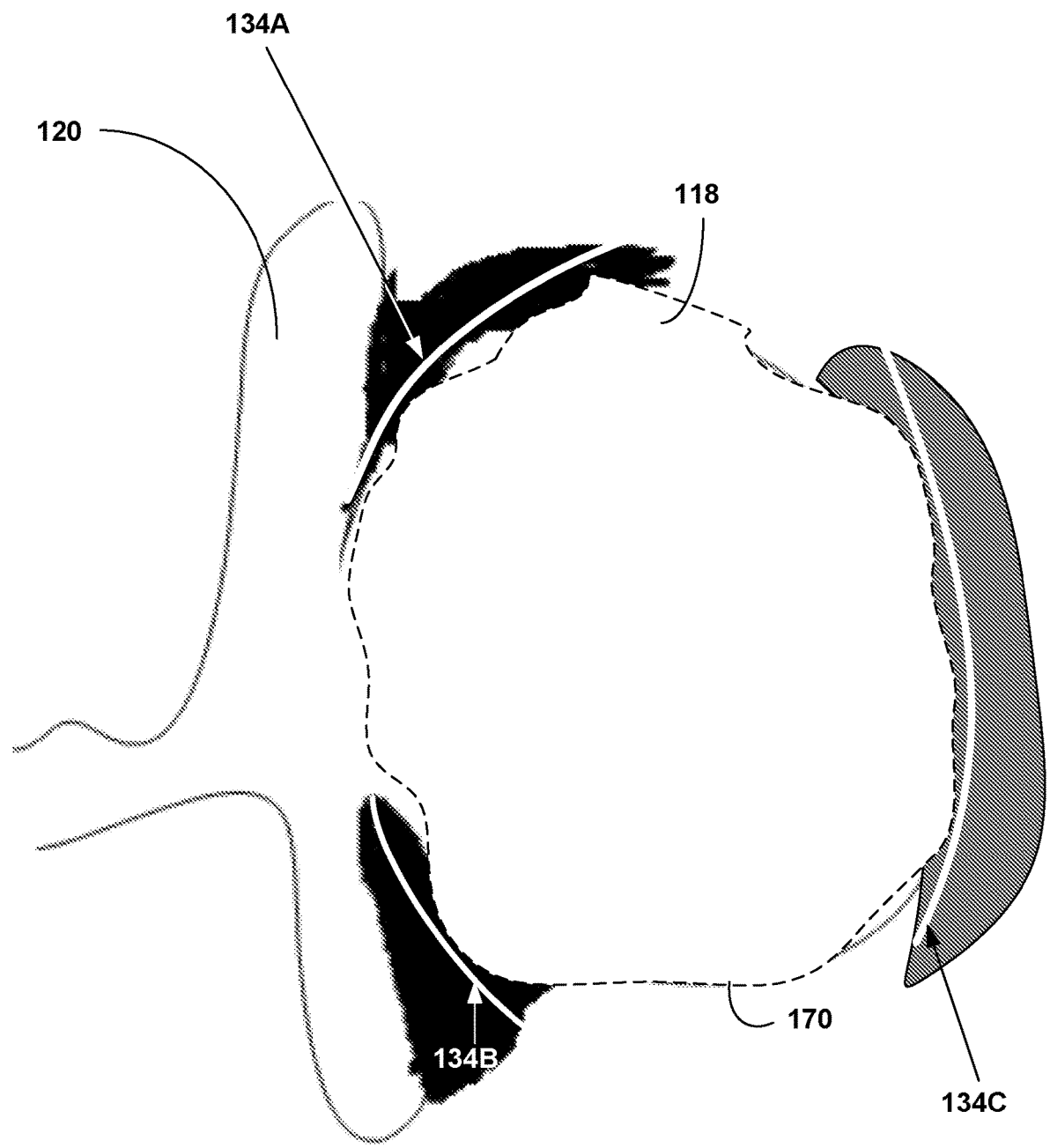
FIG. 8 is a conceptual diagram illustrating an example of an intermediate shape deformed to generate a mask used to determine a size and shape of patient anatomy.

FIG. 8 is a conceptual diagram illustrating an example of an intermediate shape deformed to generate a mask used to determine a size and shape of patient anatomy. For instance, FIG. 8 illustrates shape 170 which is generated from deforming intermediate shape 152 of FIG. 7 to fit contour 134. As shown in FIG. 8, shape 170 is a relative approximation of contour 134. In the example of FIG. 8, processing circuitry 102 extended intermediate shape 152 such that shape 170 approximately fits contour 134.

Shape 170 may be considered as the fitted-closed surface, which may be a mask used to determine shape of the anatomical object. In this way, processing circuitry 102 may be considered as generating a mask (e.g., shape 170) used to determine the shape of the anatomical object (e.g., humeral head 11) based on the intermediate shape 152.

In one or more examples, processing circuitry 102 may output information indicative of the mask (e.g., fitted-closed surface 170). For example, processing circuitry 102 may determine which voxels of the one or more images that are within the mask based on the information indicative of the mask, determine which of the determined voxels within the mask have voxel intensities greater than or equal to one or more threshold intensity values, and generate information indicative of the shape of the anatomical object based on the determined voxels within the mask having voxel intensities greater than or equal to the one or more threshold intensity values.

In this manner, processing circuitry 102 may perform the closed surface fitting (CSF) segmentation algorithm. The result of the segmentation algorithm may be a more accurate representation of the anatomical object than the contour generated from the initial segmentation or voxel intensity comparisons. A surgeon may use the representation of anatomical object for surgical planning as one example. For instance, the representation (e.g., shape) of the anatomical object may indicate to the surgeon the size and location of the anatomical object, and the surgeon can then determine which surgical tools to use, if any shaping of the anatomical object is needed, which implant to use, where to implant the implant, and the like.

In the above examples, processing circuitry 102 is described as performing two iterations. In the first iteration, processing circuitry 102 generated intermediate shape 152, and in a second iteration, processing circuitry 102 generated shape 170 based on intermediate shape 152, where shape 170 is the fitted-closed surface that is an approximate fit for contour 134. However, the example techniques described in this disclosure are not so limited.

In some examples, processing circuitry 102 may be configured to perform multiple iterations (e.g., three, four, five or more iterations). In each iteration, processing circuitry 102 may be configured to generate a new intermediate shape. In such examples, generating the fitted-closed surface of contour 134 based on the intermediate shape encompasses the scenario where processing circuitry 102 generates the fitted-closed surface of contour 134 based on the newest intermediate shape.

Also, as described above, in one or more iterations, such as a first iteration, processing circuitry 102 may determine corresponding points based on one or more normal vectors extending a maximum of a first distance and for a second, subsequent iteration, processing circuitry 102 may determine corresponding points based on one or more normal vectors extending a maximum of a second distance, where the second distance is less than the first distance. For example, as described above, the maximum distance that vectors 142A-142D can extend is greater than the maximum distance that vectors 158A-158D can extend.

In some examples, processing circuitry 102 may also utilize an elasticity value to determine a manner in which to deform shape 106 or intermediate shape 152. An elasticity value may be indicative of an amount of change to be applied to curvature of area surrounding the one or more points on shape 106 or shape 152 that are being extended towards contour 134. For example, a high elasticity value, just the point would extend towards its corresponding point creating a bulge or a narrow peak where the point extended towards its corresponding point. For a low elasticity value, not only does the point extend towards its corresponding point, but the curvature of the shape changes forming a more rotund shape rather than narrow peak. For instance, a point extending based on a high elasticity value can be conceptually thought of as forming a narrow and thin Gaussian curve with fast roll off. A point extending based on a low elasticity value can be conceptually thought of as forming a wider Gaussian curve with a slow roll off.

Figure 9A:
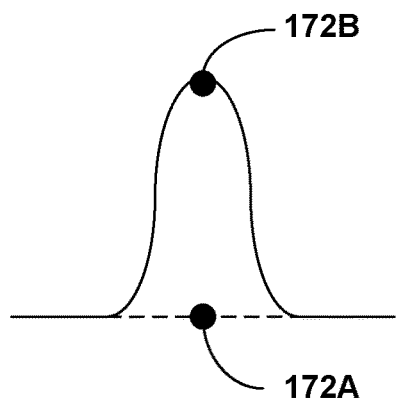
FIGS. 9A-C are conceptual diagrams illustrating examples of impact on curvature for different elasticity values.
Figure 9B:
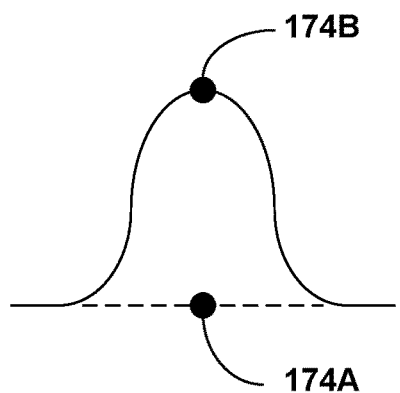
Figure 9C:
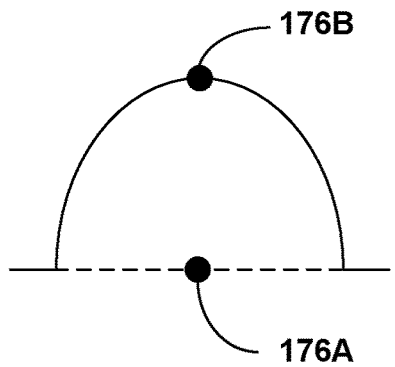

FIGS. 9A-9C are conceptual diagrams illustrating examples of impact on curvature for different elasticity values. FIGS. 9A, 9B, and 9C illustrate points 172A, 174A, and 176A, respectively, being extended. Points 172A, 174A, and 176A may be examples of points 140 or points 156 of FIGS. 6 and 7.

In FIG. 9A, assume that the elasticity value associated with point 172A is relatively high. In this example, point 172A extends to point 172B but the curvature of the surrounding surface does not change as much as the examples of FIGS. 9B and 9C. In FIG. 9A, movement of point 172A to point 172B results in bulge rather than a more uniform, homogenous change in the curvature of the surrounding area.

In FIG. 9B, assume that the elasticity value associated with point 174A is relatively medium. In this example, point 174A extends to point 174B and the curvature of the surrounding surface changes slightly (e.g., more than example of FIG. 9A and less than example of FIG. 9C).

In FIG. 9C, assume that the elasticity value associated with point 176A is relatively low. In this example, point 176A extends to point 176B and the curvature of the surrounding surface changes more to create a more uniform, homogenous change in the curvature of the surrounding area. For example, rather than creating a bulge like the example of FIG. 9A, point 176A extending to point 176B creates a more rotund change to the curvature.

The following provides an example of what the maximum distances for the vectors and what the elasticity values of points on shape 106 or one of the intermediate shapes may be. The following is merely provided as an illustrative example and should not be considered limiting.

For the first iteration, the maximum distance for the vectors may be 25 mm and the elasticity value may be 3. For the second iteration, the maximum distance for the vectors may be 15 mm and the elasticity value may be 3. For the third iteration, the maximum distance for the vectors may be 10 mm and the elasticity value may be 3. For the fourth iteration, the maximum distance for the vectors may be 5 mm and the elasticity value may be 4. For the fifth iteration, the maximum distance for the vectors may be 5 mm and the elasticity value may be 4. For the sixth iteration, the maximum distance for the vectors may be 2 mm and the elasticity value may be 5. For the seventh iteration, the maximum distance for the vectors may be 2 mm and the elasticity value may be 5.

Figure 10:
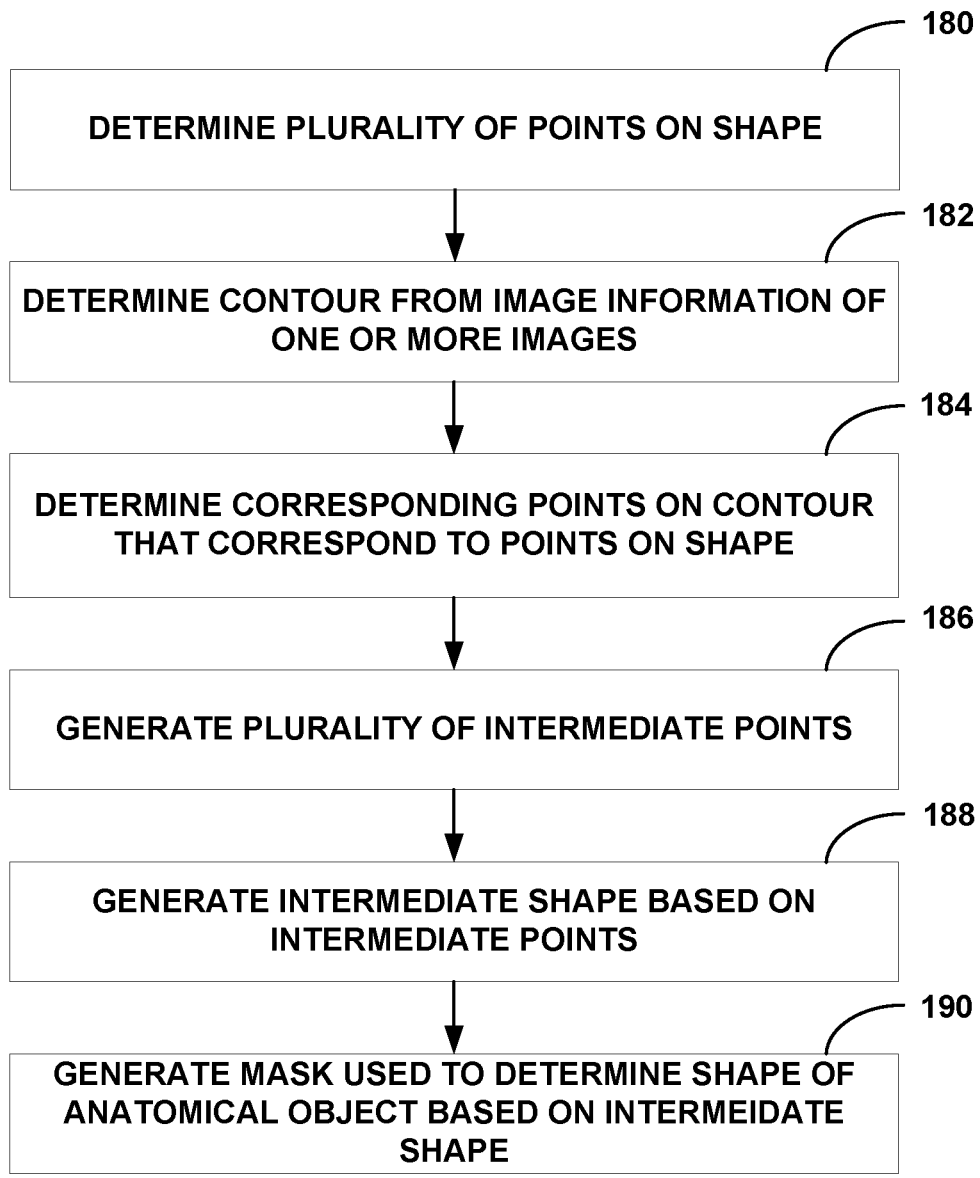
FIG. 10 is a flowchart illustrating an example method of operation in accordance with one or more example techniques described in this disclosure.

FIG. 10 is a flowchart illustrating an example method of operation in accordance with one or more example techniques described in this disclosure. For instance, FIG. 10 illustrates example techniques of performing a CSF segmentation to determine information for an anatomical object.

As illustrated, processing circuitry 102 may determine a plurality of points on shape 106 (180). For example, processing circuitry 102 may determine points 140A-140D on shape 106 (e.g., a closed surface shape) as illustrated in FIG. 6. As one example, shape 106 is a sphere. As one example, shape 106 is a mean shape of an anatomical object.

Processing circuitry 102 may determine a contour (e.g., contour 134) from image information of one or images (e.g., scans 108) (182). As one example, processing circuitry 102 may determine a change in absolute intensity between image content in one or more scans 108 (e.g., based on evaluation of the pixel or voxel intensity), and may determine contour 134 based on the change in intensity. As another example, processing circuitry 102 may determine contour 134 by performing an initial segmentation of the anatomical object. As another example, processing circuitry 102 may determine (e.g., generate or receive) a Hessian feature image indicating regions having higher intensity gradients between two or more voxels. Processing circuitry 102 may determine contour 134 in between the indicated regions in the Hessian feature image (e.g., based on separation between anatomical objects).

In some examples, processing circuitry 102 may be configured to determine a location of the anatomical object. For example, as described above, processing circuitry 102 may identify spherical shapes in scans 108 and utilize a score-based scheme to determine a shape (e.g., the spherical shape) that is most likely to be the anatomical object. For example, as described above, processing circuitry 102 may determine gradient vectors to identify a location where the gradient vectors intersect as a location that is the center of a spherical shape and determine a score for the spherical shape based on the gradient vectors. In some examples, the score-based scheme may also be based on size of the spherical shape and its proximity to other bony structures like glenoid 120. Furthermore, processing circuitry 102 may determine a center location of the spherical shape (e.g., based on intersections of gradient vectors) and determine an initial position of shape 106 based on the determined center. To determine the plurality of points on shape 106, processing circuitry 102 may determine the plurality of points based on the initial position of shape 102.

Processing circuitry 102 may determine corresponding points on contour 124 that correspond to the plurality of points 140A and 140B on shape 106 based on respective normal vectors 142A and 142B projecting from points 140A and 140B and normal vectors projecting from points on contour 134 (184). In the above examples, for point 140A (e.g., a first point on shape 106), processing circuitry 102 may determine intersection point 144A based on normal vector 142A (e.g., a first normal vector projecting from the first point on shape 106). As described above, intersection point 144A on contour 134 intersects normal vector 142A projecting from point 140A.

Processing circuitry 102 may determine a set of points on contour 134 that are proximate to intersection point 144A on contour 134. Processing circuitry 102 may determine normal vectors projecting from intersection point 144A and the set of points (e.g., on contour 134 but not limited to being on contour 134) that are proximate to intersection point 144A.

In one or more examples, processing circuitry 102 may determine angular differences between the first normal vector for the first point on shape 106 (e.g., normal vector 142A for point 140A) and the normal vectors for intersection point 144A (e.g., angular different 146A) and the set of points on contour 134 that are proximate to intersection point 144A. Processing circuitry 102 may determine the corresponding point on contour 134 that corresponds to the first point on the shape (e.g., point 140A) based on a point on contour 134, from intersection point 144A on contour 134 and the set of points on contour 134, having a normal vector with angular difference less than threshold (e.g., a smallest angular difference) with the first normal vector (e.g., normal vector 142A).

The above example is with respect to point 140A (e.g., a first point on shape 106). Processing circuitry 102 may perform similar operations for the other points on shape 106 to determine respective corresponding points on contour 134 (e.g., point 140B). In one or more examples, processing circuitry 102 may determine the corresponding points on contour 134 starting from the initial position of shape 106. However, some points may not have corresponding points on contour 134 (e.g., point 140C because there is a gap in contour 134 and point 140D because the maximum distance that vector 142D extended did not result in intersecting with contour 134).

Processing circuitry 102 may be configured to generate a plurality of intermediate points between the points on shape 106 and the corresponding points on contour 134 (186). For example, processing circuity 102 may utilize a non-rigid registration such as b-spline registration to determine by how much to extend points on shape 106 towards points on contour 134. The b-spline registration may also extend points 140C and 140D that did not have corresponding points on contour 134. As another example, processing circuitry 102 may determine a length of the normal vectors and select intermediate points that are a fraction of the length to contour 134 (e.g., halfway).

Processing circuity 102 may generate intermediate shape 152 based on the plurality of intermediate points (188). In a later iteration, processing circuitry 102 may generate intermediate points starting from intermediate shape 152 but may generate these intermediate points as a better fit with contour 124 to generate shape 170, as illustrated in FIG. 8. For example, processing circuitry 102 may control the elasticity value as a way to control the amount by which the curvature of surrounding surface changes.

In this way, processing circuitry 102 may generate a mask used to determine the shape of the anatomical object based on intermediate shape 152 (190). There may be various ways in which processing circuitry 102 may determine when to complete the iterations of deforming shape 106 to generate the fitted-closed surface (e.g., mask). As one example, processing circuitry 102 may be configured to perform a fixed number of iterations. As another example, processing circuitry 102 may be configured to determine a distance between contour 134 and each one of the intermediate shapes and stop the iterations when the distance is less than a threshold (e.g., minimized).

Also, it should be understood that where there are more than two iterations, the shape used to fit to contour 134 to generate the mask would still be generated based on intermediate shape 152 such as based on a new intermediate shape for each iteration. For instance, processing circuitry 102 may iteratively determine, for each iteration, corresponding points on contour 134 that correspond to a plurality of points on a current instance of the intermediate shape 152 based on respective normal vectors of points on the current instance of the intermediate shape 152 and normal vectors of points on contour 134. For example, for each iteration, there is a new instance of intermediate shape 152. If there are two iterations, then shape 170 is the next new instance of intermediate shape 152. However, there may be more than two iterations. Processing circuitry 102 may generate, for each iteration, a set of intermediate points between the points on the current instance of the intermediate shape 152 and the points on contour 134 based on the corresponding points on contour 134. Processing circuitry 102 may iteratively generate, for each iteration, a new intermediate shape based on the set of intermediate points.

In this manner, processing circuitry 102 may iteratively deform shape 106 until processing circuitry 102 generates a fitted-closed surface that forms as a mask to determine which voxels belong to the anatomical object. For example, processing circuitry 102 may determine which voxels of the one or more images that are within the mask. Processing circuitry 102 may determine which of the determined voxels within the mask have voxel intensities greater than or equal to one or more threshold intensity values. The voxels that are within the mask and have voxel intensities greater than or equal to one or more threshold intensity values are voxels that belong to the anatomical object. By determining which voxels belong to the anatomical objects, processing circuitry 102 may generate information indicative of the shape of the anatomical object.

Processing circuity 102 may cause display 110 to display a model of the anatomical object, which would be the shape of humeral head 118. In some examples, processing circuitry 102 may cause visualization device 116 to display the model of the anatomical object for the surgeon to view and plan the surgery. For instance, one or more example uses of visualization device 116 are described above with respect to FIG. 1. Using visualization device 116, the surgeon may be able to determine the tools to use, if any shaping of the anatomical object is needed (e.g., preparation of anatomical object for implant), size and shape of implant to use, where to insert the implant, and the like as examples of pre-operative planning. Since information of the shape, which includes location, of the anatomical object may be useful to the surgeon, the example techniques describe ways in which to determine shape of the anatomical object in a way that overcomes limitations of imaging modalities and other techniques. In general, by having size and shape information of the anatomical object, the surgeon can visualize the human patient's anatomy and allow for the anatomical object to be segmented out from the result of the nearby tissue and bone. With pre-operative visualization, the surgeon can plan for the surgical process and select the right tools to utilize.

While the techniques been disclosed with respect to a limited number of examples, those skilled in the art, having the benefit of this disclosure, will appreciate numerous modifications and variations there from. For instance, it is contemplated that any reasonable combination of the described examples may be performed. It is intended that the appended claims cover such modifications and variations as fall within the true spirit and scope of the invention.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Operations described in this disclosure may be performed by one or more processors, which may be implemented as fixed-function processing circuits, programmable circuits, or combinations thereof, such as one or more digital signal processors (DSPs), general purpose microprocessors, application specific integrated circuits (ASICs), field programmable gate arrays (FPGAs), or other equivalent integrated or discrete logic circuitry. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute instructions specified by software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. Accordingly, the terms "processor" and "processing circuitry," as used herein may refer to any of the foregoing structures or any other structure suitable for implementation of the techniques described herein.

Various examples have been described. These and other examples are within the scope of the following claims.

The invention claimed is:

1. A method for segmenting an anatomical object from image information of a patient, the method comprising:
   determining a plurality of points on a deformable shape;
   determining a contour, used to determine a shape of the anatomical object, from the image information of one or more images of the patient;
   determining at least one of:
      respective normal vectors projected from the points on the deformable shape; and
      respective normal vectors projected from points on the contour;
   determining corresponding points on the contour that each correspond to a respective point of the plurality of points on the deformable shape based on at least one of the respective normal vectors projected from the points on the deformable shape or the respective normal vectors projected from points on the contour;
   generating a plurality of intermediate points between the points on the deformable shape and the corresponding points on the contour;
   generating an intermediate shape based on the plurality of intermediate points;
   generating a mask used to determine the shape of the anatomical object based on the intermediate shape;
   determining which voxels of the one or more images are within the mask;
   determining which of the determined voxels within the mask have voxel intensities greater than or equal to one or more threshold intensity values; and
   generating information indicative of the shape of the anatomical object based on the determined voxels within the mask having voxel intensities greater than or equal to the one or more threshold intensity values.

2. The method of claim 1, further comprising:
   determining a Hessian feature image indicating regions in the one or more images having higher intensity gradients between two or more of the voxels,
   wherein determining the contour comprises determining the contour in between the indicated regions in the Hessian feature image.

3. The method of claim 1, further comprising:
   determining an initial segmentation of the anatomical object based on the image information,
   wherein determining the contour comprises determining the contour based on the initial segmentation.

4. The method of claim 1, further comprising:
   for each iteration of a plurality of iterations:
      determining corresponding points on the contour that each correspond to a respective point of the plurality of points on a current instance of the intermediate shape based on respective normal vectors projected from points on the current instance of the intermediate shape and, for the iteration, normal vectors projected from points on the contour;
      generating a set of intermediate points between the points on the current instance of the intermediate shape and the points, for the iteration, on the contour based on the corresponding points on the contour; and
      generating a new intermediate shape based on the set of intermediate points,
   wherein generating the mask comprises generating the mask based on the new intermediate shape.

5. The method of claim 4, wherein generating the set of intermediate points comprises:
   extending, for a first iteration of the plurality of iterations, one or more points of the plurality of points on the deformable shape a maximum of a first distance along respective normal vectors to generate a first set of intermediate points, wherein the one or more points of the plurality of points on the deformable shape are associated with a first elasticity value, wherein the first elasticity value is indicative of an amount of change to be applied to a curvature of an area surrounding the one or more points of the plurality of points on the deformable shape; and
   extending, for a second, subsequent iteration of the plurality of iterations, one or more points of the plurality of intermediate points on the intermediate shape a maximum of a second distance along respective normal vectors of the one or more points on the intermediate shape to generate a second set of intermediate points, wherein the one or more points of the plurality of intermediate points on the intermediate shape are associated with a second elasticity value, wherein the second elasticity value is indicative of an amount of change to be applied to a curvature of an area surrounding the one or more points of the plurality of intermediate points on the intermediate shape,
   wherein the first distance is greater than the second distance and the first elasticity value is less than the second elasticity value.

6. The method of claim 1, wherein determining corresponding points on the contour comprises determining a corresponding point on the contour that corresponds to a first point on the deformable shape, and wherein determining the corresponding point on the contour that corresponds to the first point on the deformable shape comprises:
   for the first point on the deformable shape, determining an intersection point based on a first normal vector projecting from the first point on the deformable shape, wherein the intersection point is a point on the contour intersected by the first normal vector;
   determining a set of points that are proximate to the intersection point;
   determining a normal vector projecting from the intersection point and normal vectors projecting from the set of points that are proximate to the intersection point;
   determining an angular difference between the first normal vector and the normal vector projecting from the intersection point;
   determining angular differences between the first normal vector and the normal vectors projecting from the set of points that are proximate to the intersection point; and
   determining the corresponding point on the contour that corresponds to the first point on the deformable shape based on a point on the contour, among the intersection point and the set of points, having a normal vector with a smallest angular difference with the first normal vector.

7. The method of claim 6, wherein determining the set of points that are proximate to the intersection point comprises determining the set of points on the contour that are proximate to the intersection point.

8. The method of claim 1, further comprising:
determining a center location of the anatomical object; and
determining an initial position of the deformable shape based on the determined center location,
wherein determining corresponding points on the contour that each correspond to the respective point of the plurality of points on the deformable shape comprises determining corresponding points on the contour starting from the initial position of the deformable shape.

9. The method of claim 1, wherein the deformable shape comprises a sphere.

10. The method of claim 1, wherein the deformable shape comprises a mean shape of the anatomical object.

11. The method of claim 1, wherein the anatomical object comprises a humeral head.

12. A system for segmenting an anatomical object from image information of a patient, the system comprising:
a memory configured to store information for a deformable shape; and
processing circuitry configured to:
determine a plurality of points on the deformable shape;
determine a contour, used to determine a shape of the anatomical object, from the image information of one or more images of the patient;
determine at least one of:
respective normal vectors projected from the points on the deformable shape; and
respective normal vectors projected from points on the contour;
determine corresponding points on the contour that each correspond to a respective point of the plurality of points on the deformable shape based on at least one of the respective normal vectors projected from the points on the deformable shape or the respective normal vectors projected from points on the contour;
generate a plurality of intermediate points between the points on the deformable shape and the corresponding points on the contour;
generate an intermediate shape based on the plurality of intermediate points;
generate a mask used to determine the shape of the anatomical object based on the intermediate shape;
determine which voxels of the one or more images are within the mask;
determine which of the determined voxels within the mask have voxel intensities greater than or equal to one or more threshold intensity values; and
generate information indicative of the shape of the anatomical object based on the determined voxels within the mask having voxel intensities greater than or equal to the one or more threshold intensity values.

13. The system of claim 12, wherein the processing circuitry is configured to:
determine a Hessian feature image indicating regions in the one or more images having higher intensity gradients between two or more of the voxels,
wherein to determine the contour, the processing circuitry is configured to determine the contour in between the indicated regions in the Hessian feature image.

14. The system of claim 12, wherein the processing circuitry is configured to:
determine an initial segmentation of the anatomical object based on the image information,
wherein to determine the contour, the processing circuitry is configured to determine the contour based on the initial segmentation.

15. The system of claim 12, wherein the processing circuitry is configured to:
for each iteration of a plurality of iterations:
determine corresponding points on the contour that each correspond to a respective point of the plurality of points on a current instance of the intermediate shape based on respective normal vectors projected from points on the current instance of the intermediate shape and, for the iteration, normal vectors projected from points on the contour;
generate a set of intermediate points between the points on the current instance of the intermediate shape and the points, for the iteration, on the contour based on the corresponding points on the contour; and
generate a new intermediate shape based on the set of intermediate points,
wherein to generate the mask, the processing circuitry is configured to generate the mask based on the new intermediate shape.

16. The system of claim 15, wherein to generate the set of intermediate points, the processing circuitry is configured to:
extend, for a first iteration of the plurality of iterations, one or more points of the plurality of points on the deformable shape a maximum of a first distance along respective normal vectors to generate a first set of intermediate points, wherein the one or more points of the plurality of points on the deformable shape are associated with a first elasticity value, wherein the first elasticity value is indicative of an amount of change to be applied to a curvature of an area surrounding the one or more points of the plurality of points on the deformable shape; and
extend, for a second, subsequent iteration of the plurality of iterations, one or more points of the plurality of intermediate points on the intermediate shape a maximum of a second distance along respective normal vectors of the one or more points on the intermediate shape to generate a second set of intermediate points, wherein the one or more points of the plurality of intermediate points on the intermediate shape are associated with a second elasticity value, wherein the second elasticity value is indicative of an amount of change to be applied to a curvature of an area surrounding the one or more points of the plurality of intermediate points on the intermediate shape,
wherein the first distance is greater than the second distance and the first elasticity value is less than the second elasticity value.

17. The system of claim 12, wherein to determine corresponding points on the contour, the processing circuitry is configured to determine a corresponding point on the contour that corresponds to a first point on the deformable shape, and wherein to determine the corresponding point on the contour that corresponds to the first point on the deformable shape, the processing circuitry is configured to:
for the first point on the deformable shape, determine an intersection point based on a first normal vector projecting from the first point on the deformable shape, wherein the intersection point is a point on the contour intersected by the first normal vector;

determine a set of points that are proximate to the intersection point;

determine a normal vector projecting from the intersection point and normal vectors projecting from the set of points that are proximate to the intersection point;

determine an angular difference between the first normal vector and the normal vector projecting from the intersection point;

determine angular differences between the first normal vector and the normal vectors projecting from the set of points that are proximate to the intersection point; and determine the corresponding point on the contour that corresponds to the first point on the deformable shape based on a point on the contour, among the intersection point and the set of points, having a normal vector with a smallest angular difference with the first normal vector.

18. The system of claim 17, wherein to determine the set of points that are proximate to the intersection point, the processing circuitry is configured to determine the set of points on the contour that are proximate to the intersection point.

19. The system of claim 12, wherein the processing circuitry is configured to:
determine a center location of the anatomical object; and
determine an initial position of the deformable shape based on the determined center location,
wherein to determine corresponding points on the contour that each correspond to the respective point of the plurality of points on the deformable shape, the processing circuitry is configured to determine corresponding points on the contour starting from the initial position of the deformable shape.

20. The system of claim 12, wherein the deformable shape comprises a sphere.

21. The system of claim 12, wherein the deformable shape comprises a mean shape of the anatomical object.

22. The system of claim 12, wherein the anatomical object comprises a humeral head.

23. A computer-readable storage medium storing instructions thereon that when executed cause one or more processors to:
determine a plurality of points on a deformable shape;
determine a contour, used to determine a shape of an anatomical object, from image information of one or more images of a patient;
determine at least one of:
respective normal vectors projected from the points on the deformable shape; and
respective normal vectors projected from points on the contour;
determine corresponding points on the contour that each correspond to a respective point of the plurality of points on the deformable shape based on at least one of the respective normal vectors projected from the points on the deformable shape or the respective normal vectors projected from points on the contour;
generate a plurality of intermediate points between the points on the deformable shape and the corresponding points on the contour;
generate an intermediate shape based on the plurality of intermediate points;
generate a mask used to determine the shape of the anatomical object based on the intermediate shape;

determine which voxels of the one or more images are within the mask;
determine which of the determined voxels within the mask have voxel intensities greater than or equal to one or more threshold intensity values; and
generate information indicative of the shape of the anatomical object based on the determined voxels within the mask having voxel intensities greater than or equal to the one or more threshold intensity values.

24. The computer-readable storage medium of claim 23, further comprising instructions that cause the one or more processors to:
determine a Hessian feature image indicating regions in the one or more images having higher intensity gradients between two or more of the voxels,
wherein the instructions that cause the one or more processors to determine the contour comprise instructions that cause the one or more processors to determine the contour in between the indicated regions in the Hessian feature image.

25. The computer-readable storage medium of claim 23, further comprising instructions that cause the one or more processors to:
determine an initial segmentation of the anatomical object based on the image information,
wherein the instructions that cause the one or more processors to determine the contour comprise instructions that cause the one or more processors to determine the contour based on the initial segmentation.

26. The computer-readable storage medium of claim 23, further comprising instructions that cause the one or more processors to:
for each iteration of a plurality of iterations:
determine corresponding points on the contour that each correspond to a respective point of the plurality of points on a current instance of the intermediate shape based on respective normal vectors projected from points on the current instance of the intermediate shape and, for the iteration, normal vectors projected from points on the contour;
generate a set of intermediate points between the points on the current instance of the intermediate shape and the points, for the iteration, on the contour based on the corresponding points on the contour; and
generate a new intermediate shape based on the set of intermediate points,
wherein the instructions that cause the one or more processors to generate the mask comprise instructions that cause the one or more processors to generate the mask based on the new intermediate shape.

27. The computer-readable storage medium of claim 26, wherein the instructions that cause the one or more processors to generate the set of intermediate points comprise instructions that cause the one or more processors to:
extend, for a first iteration of the plurality of iterations, one or more points of the plurality of points on the deformable shape a maximum of a first distance along respective normal vectors to generate a first set of intermediate points, wherein the one or more points of the plurality of points on the deformable shape are associated with a first elasticity value, wherein the first elasticity value is indicative of an amount of change to be applied to a curvature of an area surrounding the one or more points of the plurality of points on the deformable shape; and
extend, for a second, subsequent iteration of the plurality of iterations, one or more points of the plurality of intermediate points on the intermediate shape a maximum of a second distance along respective normal vectors of the one or more points on the intermediate shape to generate a second set of intermediate points, wherein the one or more points of the plurality of intermediate points on the intermediate shape are associated with a second elasticity value, wherein the second elasticity value is indicative of an amount of change to be applied to a curvature of an area surrounding the one or more points of the plurality of intermediate points on the intermediate shape, wherein the first distance is greater than the second distance and the first elasticity value is less than the second elasticity value.

28. The computer-readable storage medium of claim 23, wherein the instructions that cause the one or more processors to determine corresponding points on the contour comprise instructions that cause the one or more processors to determine a corresponding point on the contour that corresponds to a first point on the deformable shape, and wherein the instructions that cause the one or more processors to determine the corresponding point on the contour that corresponds to the first point on the deformable shape comprise instructions that cause the one or more processors to:

for the first point on the deformable shape, determine an intersection point on the contour based on a first normal vector projecting from the first point on the deformable shape, wherein the intersection point is a point on the contour intersected by the first normal vector;

determine a set of points that are proximate to the intersection point;

determine a normal vector projecting from the intersection point and normal vectors projecting from the set of points that are proximate to the intersection point;

determine an angular difference between the first normal vector and the normal vector projecting from the intersection point;

determine angular differences between the first normal vector and the normal vectors projecting from the set of points that are proximate to the intersection point; and determine the corresponding point on the contour that corresponds to the first point on the deformable shape based on a point on the contour, among the intersection point and the set of points, having a normal vector with a smallest angular difference with the first normal vector.

29. The computer-readable storage medium of claim 28, wherein the instructions that cause the one or more processors to determine the set of points that are proximate to the intersection point comprise instructions that cause the one or more processors to determine the set of points on the contour that are proximate to the intersection point.

30. The computer-readable storage medium of claim 23, further comprising instructions that cause the one or more processors to:

determine a center location of the anatomical object; and
determine an initial position of the deformable shape based on the determined center location, wherein the instructions that cause the one or more processors to determine corresponding points on the contour that each correspond to the respective point of the plurality of points on the deformable shape comprise instructions that cause the one or more processors to determine corresponding points on the contour starting from the initial position of the deformable shape.

31. The computer-readable storage medium of claim 23, wherein the deformable shape comprises a sphere.

32. The computer-readable storage medium of claim 23, wherein the deformable shape comprises a mean shape of the anatomical object.

33. The computer-readable storage medium of claim 23, wherein the anatomical object comprises a humeral head.

34. A method for segmenting an anatomical object from image information of a patient, the method comprising:

determining a plurality of points on a deformable shape;
determining a contour, used to determine a shape of the anatomical object, from the image information of one or more images of the patient;
determining at least one of:
respective normal vectors projected from the points on the deformable shape; and
respective normal vectors projected from points on the contour;
determining corresponding points on the contour that each correspond to a respective point of the plurality of points on the deformable shape based on at least one of the respective normal vectors projected from points on the deformable shape or the respective normal vectors projected from points on the contour, wherein determining corresponding points comprises determining a corresponding point on the contour that corresponds to a first point on the deformable shape, and wherein determining the corresponding point on the contour that corresponds to the first point on the deformable shape comprises:
for the first point on the deformable shape, determining an intersection point based on a first normal vector projecting from the first point on the deformable shape, wherein the intersection point is a point on the contour intersected by the first normal vector;
determining a set of points that are proximate to the intersection point;
determining a normal vector projecting from the intersection point and normal vectors projecting from the set of points that are proximate to the intersection point;
determining an angular difference between the first normal vector and the normal vector projecting from the intersection point;
determining angular differences between the first normal vector and normal vectors projecting from the set of points that are proximate to the intersection point; and
determining the corresponding point on the contour that corresponds to the first point on the deformable shape based on a point on the contour, among the intersection point and the set of points, having a normal vector with a smallest angular difference with the first normal vector;
generating a plurality of intermediate points between the points on the deformable shape and the corresponding points on the contour;
generating an intermediate shape based on the plurality of intermediate points; and
generating a mask used to determine the shape of the anatomical object based on the intermediate shape.

* * * * *